(12) United States Patent
Kobayashi

(10) Patent No.: US 7,733,414 B2
(45) Date of Patent: Jun. 8, 2010

(54) PHOTOGRAPHIC DEVICE AND CONTROL METHOD THEREFOR

(75) Inventor: Koji Kobayashi, Saitama (JP)

(73) Assignee: Fujifilm Corporation, Tokyo (JP)

( * ) Notice: Subject to any disclaimer, the term of this patent is extended or adjusted under 35 U.S.C. 154(b) by 1490 days.

(21) Appl. No.: 11/075,937

(22) Filed: Mar. 10, 2005

(65) Prior Publication Data
US 2005/0200744 A1 Sep. 15, 2005

(30) Foreign Application Priority Data
Mar. 12, 2004 (JP) ............................. 2004-071516

(51) Int. Cl.
H04N 5/235 (2006.01)
H04N 3/14 (2006.01)

(52) U.S. Cl. ..................... 348/362; 348/221.1; 348/296

(58) Field of Classification Search .............. 348/221.1, 348/296, 297, 231.6
See application file for complete search history.

(56) References Cited

U.S. PATENT DOCUMENTS

| | | | |
|---|---|---|---|
| 4,837,628 A * | 6/1989 | Sasaki | 348/220.1 |
| 4,984,002 A | 1/1991 | Kokubo | |
| 6,667,770 B1 * | 12/2003 | Higuchi et al. | 348/362 |
| 6,888,570 B1 * | 5/2005 | Yoshida | 348/296 |
| 7,408,574 B2 * | 8/2008 | Miyazaki | 348/231.1 |
| 2002/0085112 A1 * | 7/2002 | Hiramatsu et al. | 348/362 |
| 2004/0212723 A1 * | 10/2004 | Lin | 348/362 |

FOREIGN PATENT DOCUMENTS

JP 2-185173 A 7/1990

* cited by examiner

*Primary Examiner*—Luong T Nguyen
(74) *Attorney, Agent, or Firm*—Birch, Stewart, Kolasch & Birch, LLP

(57) ABSTRACT

There is disclosed a photographic device that uses an image sensor and an electronic viewfinder. When a release button is pressed halfway, an aperture value, an electronic shutter speed and a photosensitivity are decided based on the present subject brightness to provide a proper exposure value for photographing a still image. So long as the release button is kept being pressed halfway, a timing generator drives the image sensor to shoot video images at a frame rate of 20 Hz, and the aperture value decided for still image photography is fixed, whereas the electronic shutter speed and the photosensitivity are adjusted according to the subject brightness by use of an aperture-priority type video program. When the release button is pressed to the full, an exposure for a still image is done with the fixed aperture value.

2 Claims, 17 Drawing Sheets

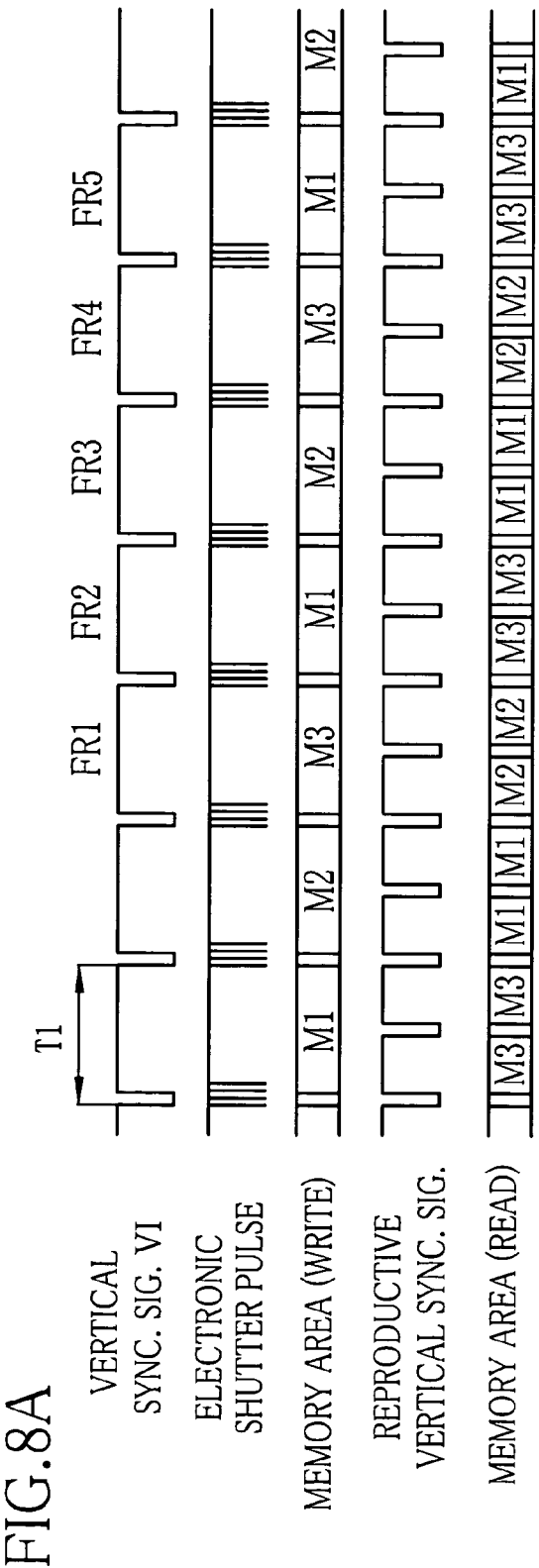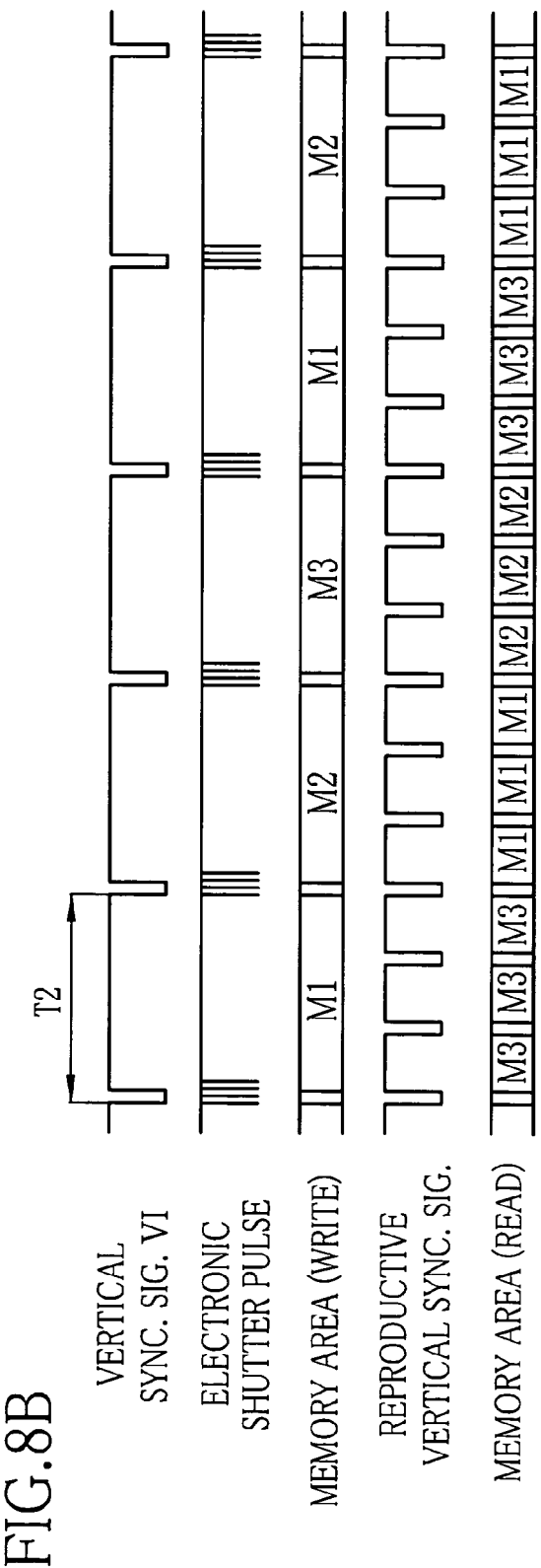

FIG.16

| TOTAL EXPOSURE TIME | FRAME PERIOD |
|---|---|
| 50m sec. < | 50m sec. |
| 25m sec. - 33m sec. | 33m sec. |
| 17m sec. - 25m sec. | 25m sec. |
| 17m sec. < | 17m sec. |

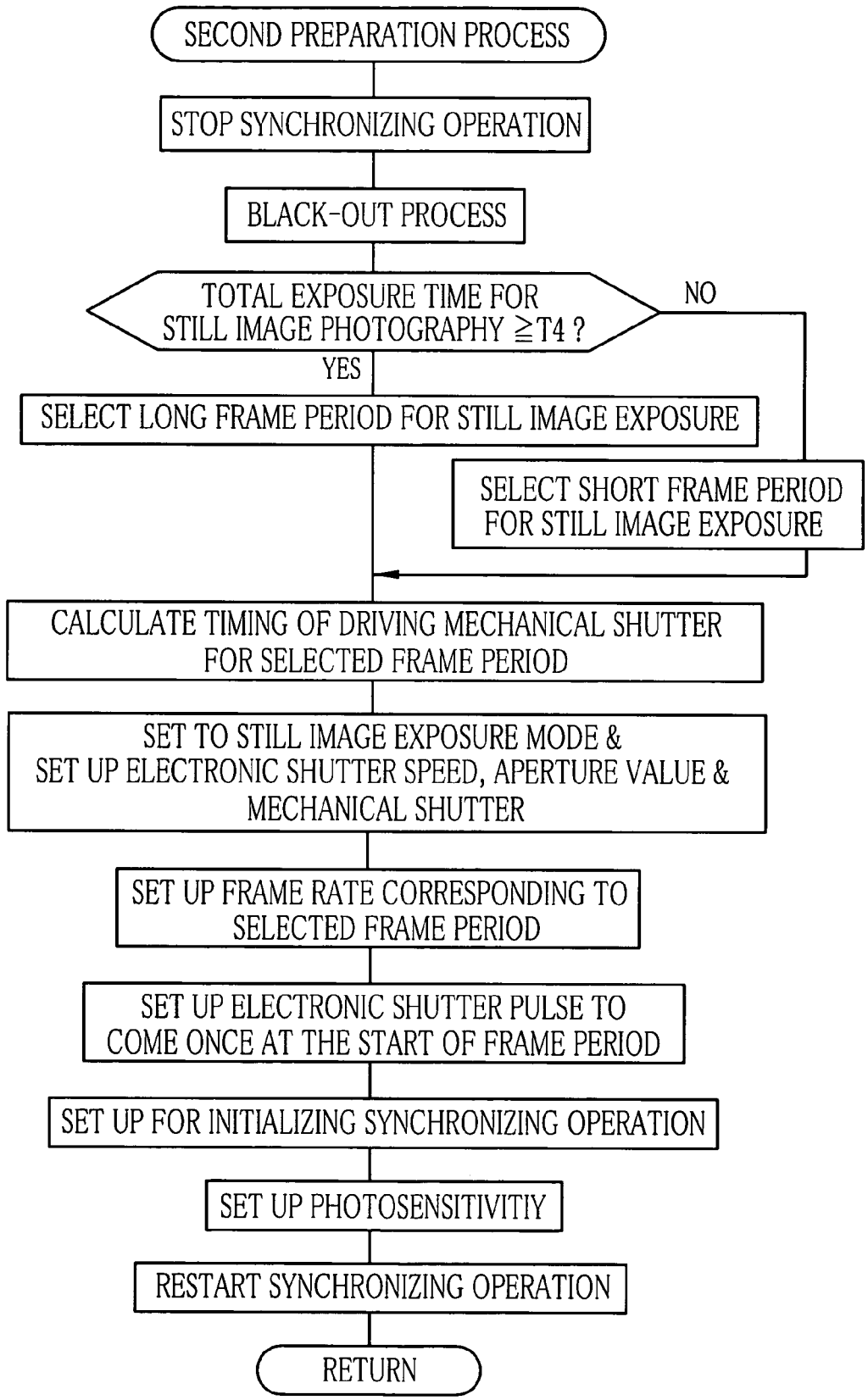

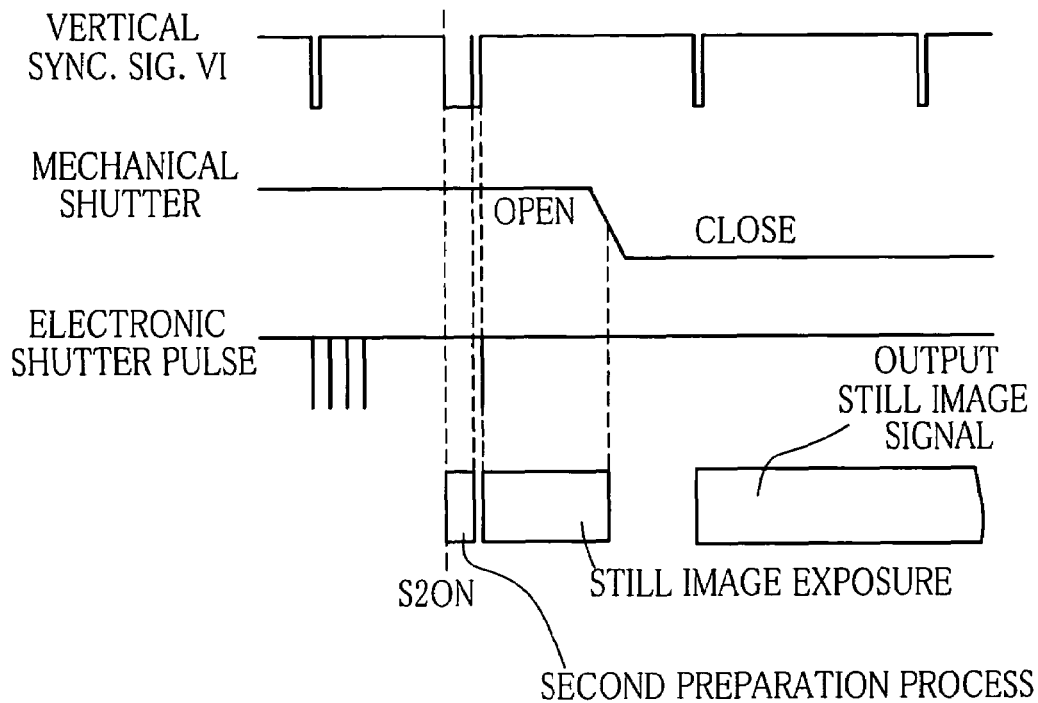
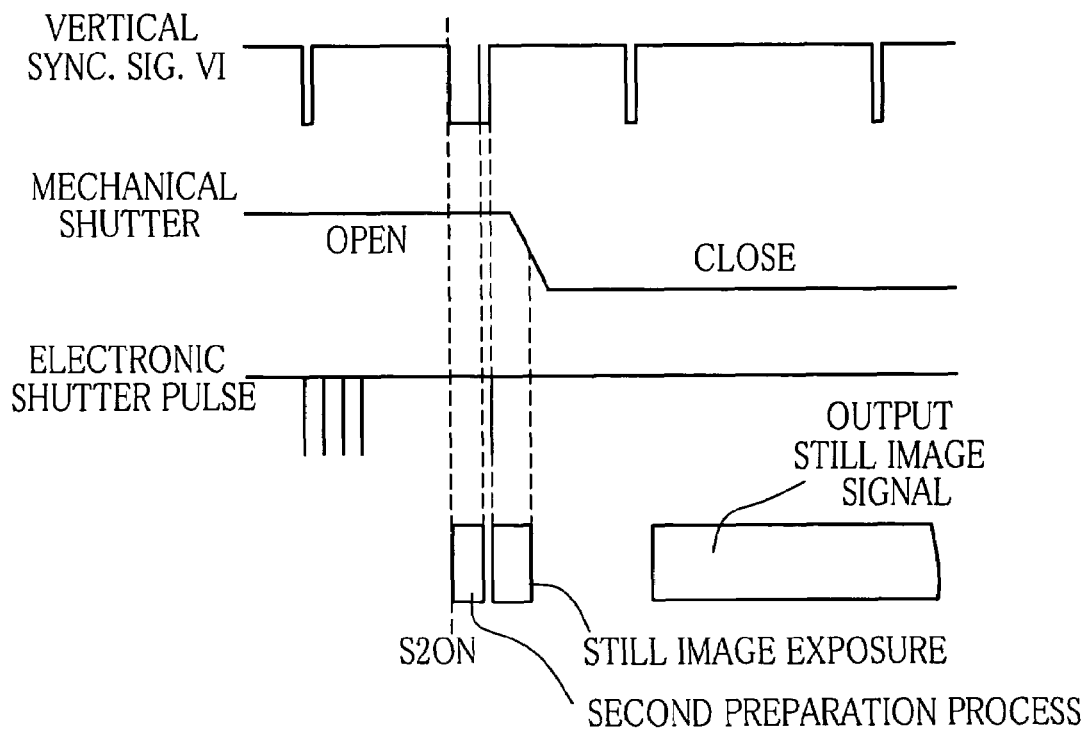

PHOTOGRAPHIC DEVICE AND CONTROL METHOD THEREFOR

FIELD OF THE INVENTION

The present invention relates to a photographic device like a digital camera and a control method for this photographic device.

BACKGROUND ARTS

Digital cameras have been widely used, wherein subjects are photographed through an imaging device such as a CCD image sensor. The digital camera shoots video images, and displays a slew of video images on a liquid crystal display that serves as an electronic viewfinder. In response to a release button being pressed, the digital camera photographs a still image and records data of the photographed still image on a recording medium like a memory card. There are such digital cameras that can record video image data.

In such a digital camera, the image sensor is exposed and read out generally at a frame rate or shooting frequency of 30 Hz, i.e. 30 frames per second, in synchronism with the recording and displaying of the video images. Meanwhile, there are two kinds of frequencies of commercial power source in Japan: 60 Hz and 50 Hz. Being powered with the 60 Hz commercial power source, a fluorescent light will blink 120 times per second. With the 50 Hz commercial power source, the fluorescent light will blink 100 times per second. Under these periodically blinking fluorescent lights, especially those activated with the 50 Hz commercial power source, so-called flicker occur in photography with the digital camera. The flicker is a phenomenon that brings variations in photographic lightness, and is caused where the frame rate of the image sensor using the 50 Hz commercial power source does not have any common multiple to the blinking cycle of the fluorescent lights.

To prevent the flicker on shooting video images of low-brightness subjects which are illuminated with fluorescent lights, especially the fluorescent lights activated with the 50 Hz commercial power source, the conventional digital camera uses a charging time of the image sensor, i.e. a shutter speed of an electronic shutter, hereinafter called the electronic shutter speed, that is set at $\frac{1}{50}$ sec. or $\frac{1}{100}$ sec. whenever possible, while an aperture value is adjusted to obtain a proper exposure value.

As described above, unless the release button is pressed down, the digital camera shoots video images through the image sensor so as to display a slew of images of the shot subjects on the LCD. The photographer frames a photographic field while observing the images on the LCD, and presses down the release button to photograph a still image. When the release button is pressed halfway, the digital camera carries out an automatic exposure (AE) process for deciding a aperture value and an electronic shutter speed for photographing a still image, and an automatic focusing (AF) process for focusing a taking lens onto the aimed subject. After the AE and AF processes are completed, the digital camera shoots video images again through the image sensor, to display a slew of images on the LCD. Thus, the LCD serves as an electronic viewfinder.

Upon the release button being fully pressed down, the digital still camera makes a freeze process to display a still image of the currently shot subject on the LCD, and then switches over the aperture value to a value predetermined in the AE process. Thereafter the digital camera makes a preparation operation for setting up a timing generator in order to drive the image sensor at a timing and an electronic shutter speed, which are determined for still image photography, as well as for setting up the timing generator with an actuation timing of a mechanical shutter. After the completion of this preparation operation, the image sensor is exposed to photograph a still image.

In some digital camera, a timing generator for outputting a variety of drive signals for driving the image sensor is set up to raise frequency of vertical synchronizing signals when the release button is fully pressed down, wherein the vertical synchronizing signals serve as a reference for the operation timing. As being loaded with parameters for deciding driving timings of the image sensor and other components, the timing generator makes the loaded parameters effective when the vertical synchronizing signal is generated first after the loading, and drives the image sensor and other components on the basis of these parameters from a frame period after the completion of setting. Therefore, raising the frequency of the vertical synchronizing signals reduces the delay from the completion of setting with respect to the still image photography through the image sensor.

As described above, since the conventional digital cameras starts many processing upon the release button being pressed to the full, there is a certain time lag to the actual start of exposure. As a known technique for minimizing the release time lag, Japanese Laid-open Patent Application No. Hei 2-185173 suggests controlling driving the image sensor by a timing generator so as to start charging of the image sensor for photographing a frame of still image in synchronism with an external trigger signal, although the charging conventionally starts after several electronic shutter pulses are given at the start of exposure for the still image photography.

One of factors that enlarge the release time lag is an operation to change the aperture value at the moment when the release button is fully pressed down. However, in order to shoot video images at such an aperture value that is adapted to the still image photography prior to the full press of the release button, the shutter speed must be changed in accordance with varying subject brightness. So it becomes impossible to keep the electronic shutter speed at a value preventive against the flicker.

In addition to that, although the method disclosed in the above prior art is effective for reducing the release time lag, this prior method needs a specific timing generator, and cannot be embodied with a general timing generator.

Since the conventional digital camera validates content set in the timing generator in synchronism with the vertical synchronizing signal, there is a delay from the shutter release to the actual start of an exposure for photographing a still image. As described above, the delay, a factor for the release time lag, can be reduced by raising the frequency of the vertical synchronizing signal. But because there is a limit in the available range of frequency of the vertical synchronizing signal, this method cannot sufficiently reduce the delay and the release time lag.

SUMMARY OF THE INVENTION

In view of the foregoing, a primary object of the present invention is to provide a photographic device and a control method therefore, which reduce the release time lag effectively without the need for a specific timing generator.

To achieve the above and other objects, the present invention provides a photographic device that comprises a release button movable to a half-pressed position and a full-pressed position; an image sensor having a function of an electronic shutter and converting an optical image of a subject to a still image signal, the image sensor shooting video images while the release button is not pressed or is kept in the half-pressed position, and photographing a still image when the release button is moved to the full-pressed position; a display device for displaying images on the basis of still image signals output from the image sensor; an exposure control device that sets an electronic shutter speed of the image sensor, an aperture value and a photosensitivity according to subject brightness based on a first program while the release button is not pressed, the first program setting the electronic shutter speed to be a value preventive against flicker in a low brightness range, the exposure control device deciding an aperture value for still image photography upon the release button being pressed halfway, and so long as the release button is kept in the half-pressed position, the exposure control device using an aperture-priority type second program for setting an electronic shutter speed and a photosensitivity according to subject brightness while applying the aperture value for still image photography to the second program; and a frame rate setting device that sets a first frame rate as a frame rate of the image sensor while the release button is not pressed, and sets a second frame rate as the photographic frame so long as the release button is kept in the half-pressed position, the second frame rate being adapted to prevent flicker.

According to a preferred embodiment, the photographic device further comprises a timing generator that drives the image sensor based on parameters set therein, and generates a vertical synchronizing signal that is synchronized with a driving cycle of the image sensor; and a timing control device that controls timing of setting parameters for still image photography in the timing generator, depending upon when the release button is pressed to the full relative to the vertical synchronizing signal, such that the parameters for still image photography are set in the timing generator either at a time immediately after the release button is pressed to the full, or at a time when the vertical synchronizing signal is generated first after the release button is pressed to the full.

According to another present invention, a photographic device comprises an image sensor driven either in a video exposure mode or in a still image exposure mode, the image sensor being switched over from the video exposure mode to the still image exposure mode to photograph a still image in response to a release signal that is entered through an external operation; a timing generator generating a vertical synchronizing signal that is synchronized with a driving cycle of the image sensor, and switching the image sensor to a selected one of the exposure modes by validating parameters as set therein according to the selected exposure mode, at a time when the vertical synchronizing signal is generated first after the parameters are completely set in the timing generator; and a control device that sets parameters for the still image exposure mode in the timing generator and initializes synchronizing operation of the timing generator to restart the synchronizing operation immediately after the entry of the release signal, thereby to cause the timing generator to generate the vertical synchronizing signal immediately after the setting of the parameters for still image photography.

According to the present invention, a control method for a photographic device that shoots video images through an image sensor and displays the shot video images while a release button is not pressed or is kept in a half-pressed position, and photographs a still image through the image sensor upon the release button being pressed fully, the control method comprising steps of:

using a first program for setting an electronic shutter speed of the image sensor, an aperture value and a photosensitivity in accordance with subject brightness while the release button is not pressed, the first program setting the electronic shutter speed to a value preventive against flicker in a low brightness range;

deciding an aperture value for still image photography upon the release button being pressed halfway; and using while the release button is kept in the half-pressed position, an aperture-priority type second program for setting an electronic shutter speed and a photosensitivity according to subject brightness while applying the aperture value for still image photography to the second program and using a frame rate adapted to prevent flicker.

According to another control method of the present invention, for a photographic device that is provided with a timing generator for driving an image sensor, the timing generator generating vertical synchronizing signals in synchronism with driving cycle of the image sensor, and validating parameters set therein synchronously with the vertical synchronizing signal being generated after the parameters is completely set in the timing generator, the photographic device switching the image sensor from a video exposure mode to a still image exposure mode to photograph a still image in response to a release signal entered through an external operation, the control method comprising steps of:

setting up the timing generator with parameters for driving the image sensor in the still image exposure mode immediately after the entry of the release signal; and immediately thereafter initializing synchronizing operation of the timing generator to restart the synchronizing operation, thereby to generate the vertical synchronizing signal to drive the image sensor in the still image exposure mode.

The present invention also provides a control method for a photographic device using an image sensor having a function of an electronic shutter wherein electronic shutter pulses are input in the image sensor from the start of each frame period, and effective charging in the image sensor starts from when the electronic shutter pulses stop being input, the control method comprising steps of:

determining an exposure time for still image photography according to a subject brightness;

selecting from among different frame periods the shortest one of those frame periods which permit charging during the exposure time;

deciding timing of stopping inputting the electronic shutter pulses so as to provide the exposure time; and photographing a still image in the selected frame period and the decided timing in response to a release signal.

The present invention further provides a control method for a photographic device using an image sensor and a mechanical shutter, the image sensor having a function of an electronic shutter that gives effect to charging from when electronic shutter pulses stop being input in the image sensor, the control method comprising steps of:

inputting only a single electronic shutter pulse in the image sensor at the start of a frame period for still image photography; and activating the mechanical shutter to block photographic light from the image sensor when an exposure time determined according to a subject brightness has elapsed since the single electronic shutter pulse.

Since the frame rate preventive against the flicker is used for shooting video images while the release button is pressed halfway, the flicker will not occur even if the shutter speed is changed during this condition. Since the aperture value is determined for still image photography up on the release button being pressed halfway, and is fixed at this value so long as the release button is kept being pressed, it is unnecessary to change the aperture value in response to the release button being pressed to the full. Therefore the release time lag is reduced.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein:

FIG. 8A shows timing charts in the first video exposure mode;

FIG. 8B shows timing charts in the second video exposure move;

FIG. 16 is an explanatory diagram illustrating another embodiment where there are four kinds of frame periods available for a still image exposure;

FIG. 17 is a flowchart illustrating a sequence of the second preparation process, according to a further embodiment that controls driving timing of a mechanical shutter for a still image exposure; and FIGS. 18A and 18B show timing charts illustrating two kinds of operations done when a release button is pressed to the full in the embodiment of FIG. 17.

DESCRIPTION OF THE PREFERRED EMBODIMENTS

Figure 1:
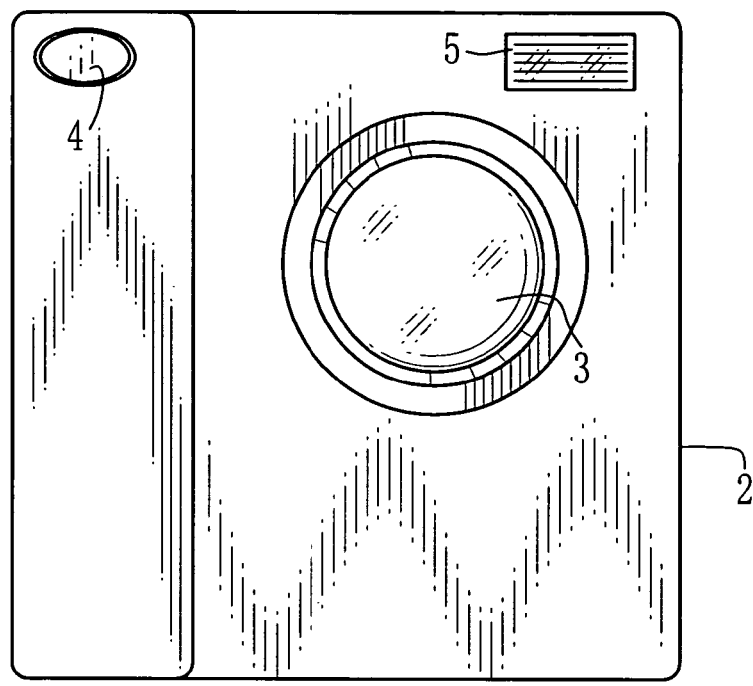
FIG. 1 is a schematic front view of a digital camera embodying the present invention.
Figure 2:
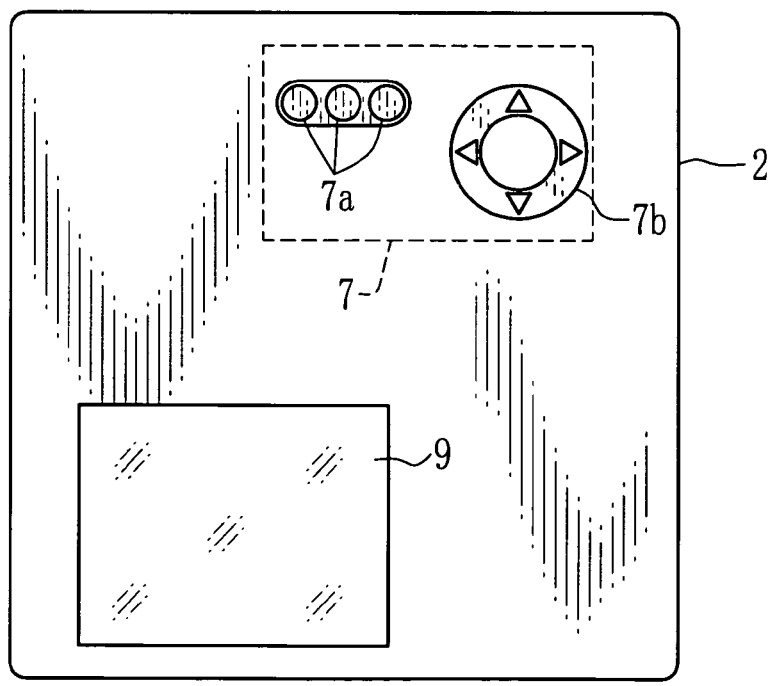
FIG. 2 is a schematic rear view of the digital camera of FIG. 1.

As shown in FIGS. 1 and 2, a digital camera has a photographic lens 3 with zooming function, a release button 4 and a flash window 5 on a front side of its camera body 2, and a console 7 consisting of control buttons 7a and a cursor key 7a, and an LCD 9 on a rear side of the camera body 2.

Figure 3:
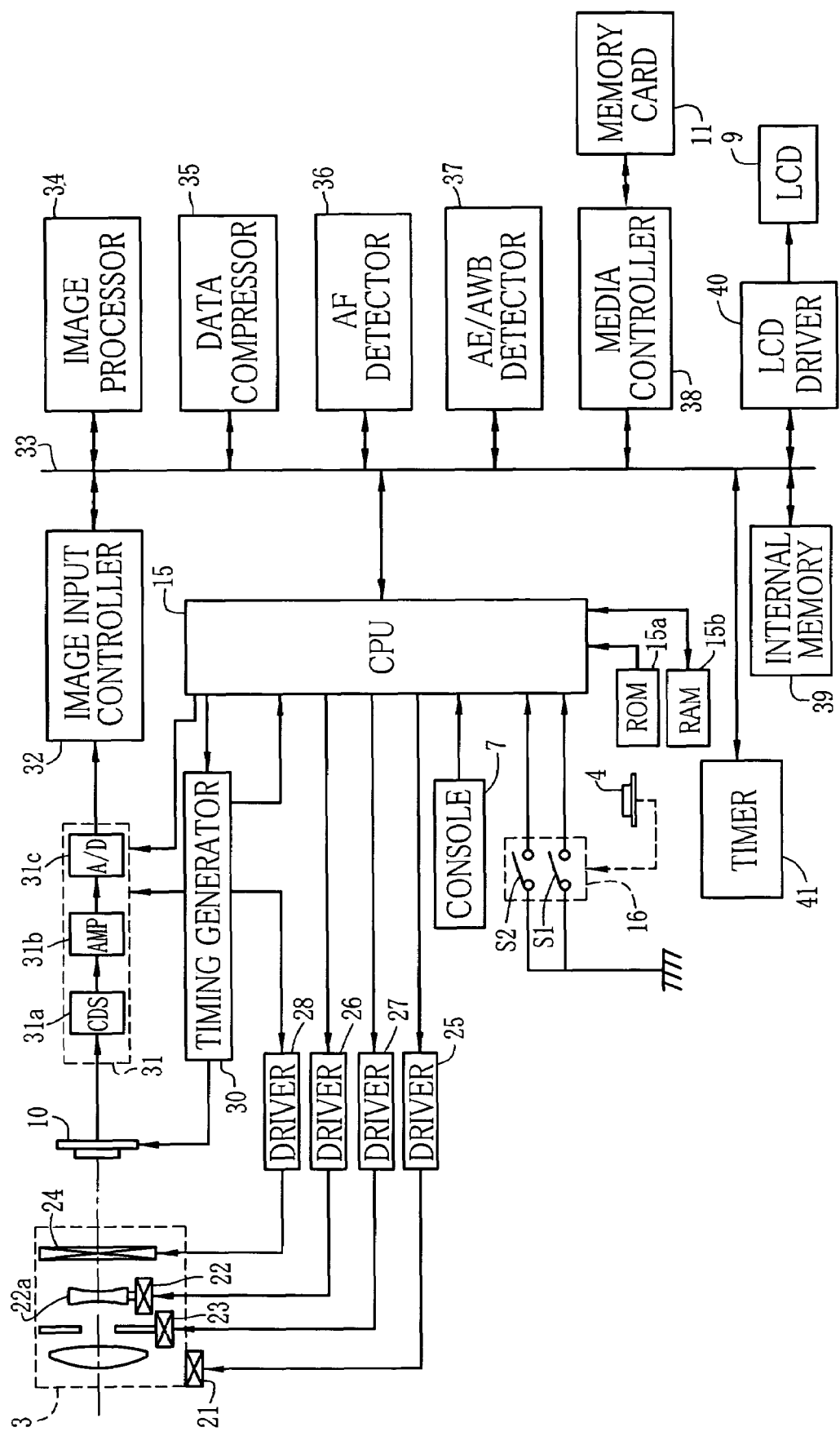
FIG. 3 is a block diagram illustrating an internal structure of the digital camera.

The release button 4 can be pressed down in two steps: halfway and full. So long as the release button 4 is not pressed in a camera mode, still image signals of subjects are continually picked up through a CCD image sensor 10 that is located behind the photographic lens 3, as shown in FIG. 3, and the LCD 9 displays a slew of video images based on the still image signals currently picked up through the CCD image sensor 10. So the LCD 9 functions as an electronic viewfinder.

Upon the release button 4 being pressed halfway, a first preparation process is carried out. The first preparation process consists of an AE (automatic exposure) process for deciding a shutter speed, an aperture value and a photosensitivity, which are suitable for photographing a still image, an AF (automatic focusing) process for focusing the photographic lens 3 onto a subject, an aperture switching process for switching to the decided aperture value, and a process for changing exposure mode of the CCD image sensor 10, as set forth in detail later. While the release button 4 is being kept in the halfway position, the digital camera shoots video images and displays them on the LCD 9 like before the release button 4 being pressed.

When the release button 4 is pressed to the full, a second preparation process is carried out, before the CCD image sensor 10 executes a still image exposure, i.e. an exposure for photographing a still image. The second preparation process consists of a setting process for setting up the shutter speed and the photosensitivity as decided for still image photography in the first preparation process, a process for changing the CCD image sensor 10 to an exposure mode for still image photography, and other minor processes. The photographed still image is converted into a frame of digital image data, and stored in a removable memory card 11, see FIG. 3.

The flash window 5 projects a flash of light toward a main subject if the main subject has a lower brightness than a predetermined level at the still image photography. The console 7 is operable to turn the power on or off, choose between the camera mode and a player mode and, in the camera mode, choose between the still image photography mode and a video shooting mode. The console 7 is also used for zooming up or down the photographic lens 3, selecting desirable image frames in the player mode, and so on. The LCD 9 serves not only as the electronic viewfinder that displays a slew of video images of the subjects, but also displays photographed images, i.e. recorded images, in the player mode.

Referring to FIG. 3 illustrating an internal structure of the digital camera, the console 7 sends control signals to a CPU 15 in accordance with operations on the control buttons 7a and the cursor key 7b. A switching section 16 consists of first and second release switches S1 and S1 that are turned on or off in cooperation with the release button 4 being pressed. The first release switch S1 is turned ON as the release button 4 is pressed halfway, whereas the second release switch S2 is turned ON as the release button 4 is pressed to the full. The switching conditions of the release switches S1 and S2 are sent to the CPU 15. That the second release switch S2 is turned ON is regarded as a release signal for starting the still image photography.

The CPU 15 controls respective parts of the digital camera on the basis of various signals from the console 7 and the switching section 16. ROM 15a and RAM 15b are connected to the CPU 15. The ROM 15a mainly stores programs for executing many sequences, and programs that correspond to different programming diagrams for deciding a suitable combination of shutter speed, aperture value and photosensitivity or gain of the image sensor 10. So the CPU 15 controls the respective parts in accordance with these programs. The RAM 15b is used as a work memory for storing temporarily data necessary for executing some sequence.

The photographic lens 3 is an assembly having a zooming mechanism 21, a focusing mechanism 22, a stop diaphragm 23 and a mechanical shutter 24 mounted therein. The zooming mechanism 21 zooms the photographic lens 3 by moving lens elements of the photographic lens 3 in response to zooming operation on the console 7. While the release button 4 is not pressed in the camera mode, the focusing mechanism 22 always changes the focus of the photographic lens 3 according to varying subject distance. When the release button 4 is pressed halfway, the focus is fixed on a subject that is aimed at the moment the release button 4 is pressed halfway.

The stop diaphragm 23 controls intensity of light falling on the CCD image sensor 10 by adjusting the aperture value, i.e., the size of a stop aperture. The stop diaphragm 23 adjusts the aperture value according to the subject brightness so long as the release button 4 is not pressed, that is, for the video shooting. When the release button 4 is pressed halfway, the stop diaphragm 23 is set to an aperture value that is decided for the still image photography in the AE process. The aperture value is also used for the video shooting so long as the release button 4 is kept in the half-pressed position.

The zooming mechanism 21, the focusing mechanism 22 and the stop diaphragm 23 are driven through respective drivers 25, 26 and 27 under the control of the CPU 15. The mechanical shutter device 24 has shutter blades, which are usually in an open position. The shutter blades are closed at the conclusion of an exposure for the still image photography, shielding the CCD image sensor 10 from external light, i.e. an optical image of a subject, to prevent smears. The mechanical shutter 24 is connected through a driver 28 to a timing generator 30, and is driven by mechanical shutter drive signals from the timing generator 30.

Although the substantial shutter speed or exposure time for the still image photography is controlled by use of both the mechanical shutter 24 and an electronic shutter function of the CCD image sensor 10 in the present embodiment, it is possible to omit the mechanical shutter 24.

The CCD image sensor 10 is placed behind the photographic lens 3, so the optical image of the subject is formed through the photographic lens 3 on a photoreceptive surface of the CCD image sensor 10. The CCD image sensor 10 is driven by many kinds of drive signals from the timing generator 30, and outputs photographed optical images as analog still image signals.

The CCD image sensor 10 has the electronic shutter function, that permits adjusting substantial charging time by sweeping out accumulated electronic charges in response to electronic shutter pulses from the timing generator 30. Therefore, shutter speed of the electronic shutter, hereinafter called the electronic shutter speed, may be adjusted by controlling an input time duration of the electronic shutter pulses to the CCD image sensor 10. It is to be noted that the present embodiment is designed to input the electronic shutter pulses from the start of a frame period for photographing one frame, and stop the input of the electronic shutter pulses when a remaining time of the frame period comes to a desirable time of the electronic shutter speed.

The video exposure mode includes first and second video exposure modes. The CCD image sensor 10 is driven in the first video exposure mode so long as the release button 4 is not pressed, while it is driven in the second video exposure mode while the release button 4 is being pressed halfway. For the still image photography, the CCD image sensor 10 is driven in the still image exposure mode.

The first video exposure mode is to make an exposure to get a frame of digital image of a subject at each frame period, while reading the charges accumulated during the previous frame period, to output them as the analog still image signals. In the first video exposure mode, frame rate of the CCD image sensor 10 is set to 30 Hz, i.e. 30 frames per second, in correspondence with frame rate that is generally used for reproducing and recording video images. The first video exposure mode is used for photographing video images in the video shooting mode.

Like as the first video exposure mode, the second video exposure mode is to make an exposure to get a frame of digital image of a subject at each frame period, while outputting the still image signals obtained through an exposure in the previous frame period. The second video exposure mode is used for shooting video images while the release button 4 is being kept pressed halfway. The second video exposure mode uses frame rate of 20 Hz, i.e. 20 frames per second, so as to prevent the flicker that could be caused by the blinking of fluorescent light as driven with the commercial power source. This frame rate is also effective not to limit the electronic shutter speed, and permits lowering the minimum electronic shutter speed to $\frac{1}{20}$ sec, and thus permits using the aperture value to be used for the still image photography also while the release button 4 is being pressed halfway.

The still image exposure mode is to make an exposure to record a still image in response to the full-pressing of the release button 4. In the still image exposure mode, the exposing operation is stopped after each exposure for a frame of still image, and then charges accumulated through this exposure are read out from the CCD image sensor 10.

In the first and second video exposure modes, the charges are read out from the CCD image sensor 10 at a high speed by use of pixel-combination mode where the charges on a plural number of pixels, e.g. four pixels, of the CCD image sensor 10 are added together to convert the pixel number to 640×480 pixels.

The CPU 15 communicates with the timing generator 30 in a serial manner, to load various kinds of parameters, such as ones for the frame rate of the CCD image sensor 10, for the electronic shutter speed, for designating the video shooting or the still image photography, and ones relating to operations of the mechanical shutter 24.

To drive the CCD image sensor 10 in the first video exposure mode, the parameters for designating the video shooting, for designating the frame rate to be 30 Hz, for setting the mechanical shutter 24 in the open position, and that for the electronic shutter speed are loaded. To drive the CCD image sensor 10 in the second video exposure mode, the same parameters are loaded, except but the frame rate is set to be 20 Hz. In these video exposure modes, the parameter for the electronic shutter speed is revised according to the varying subject brightness.

To drive the CCD image sensor 10 in the still image exposure mode, the parameters for designating the still image photography, for designating a frame rate for the still image exposure, for closing the mechanical shutter 24 at a given timing during a frame period, and that for the electronic shutter speed. When the still image photography is designated, a drive signal for a still image exposure is generated during a frame period of 1/20 sec., whose interval is defined by the frame rate of 20 Hz, thereby to carry out an exposure for photographing a still image. Charges accumulated in the CCD image sensor 10 are read out as the still image signal, after the frame period for the still image exposure.

The timing generator 30 generates a vertical synchronizing signal VI whose level drops down like a pulse at the same interval as the frame rate, and each trailing edge is used as a reference operation timing. The time from a trailing edge of the vertical synchronizing signal VI to a next one is the one frame period. The vertical synchronizing signal VI is sent to the CPU 15. The timing generator 30, after being set up with the various kinds of parameters by the CPU 15, validates the set parameters to output signals corresponding to these parameters at a timing of the following trailing edge of the vertical synchronizing signal VI to the time of completion of the parameter setting. Since the set parameters are validated at the timing corresponding to the internal vertical synchronizing signal VI, it is unnecessary to output the vertical synchronizing signal VI to any external portions in order to validate the set parameters.

When the release switch S2 is turned ON, the CPU 15 makes a decision on the basis of the timing of ON-turning of the release switch S2, as to whether the timing of setting up the timing generator 30 with the parameters for the still image photography is to be immediately after the ON-turning of the release switch S2, or at the start of next frame period to the ON-turning of the release switch S2. Thereby, even while the release time lag is reduced by making the still image exposure in the next frame period to the ON-turning of the release switch S2, such a trouble is prevented that the next frame period starts before the completion of setting the parameters, so the still image exposure cannot be done properly.

In the present embodiment, whether the parameters are to be set up immediately after the ON-turning of the release switch S2, or at the start of next frame period to the ON-turning of the release switch S2 is decided depending up whether the time of ON-turning of the switch S2 is before or after a time Ta from a leading edge of the vertical synchronizing signal VI. For example, the time Ta is 35 msec. It is alternative possible to define the time Ta from a trailing edge of the vertical synchronizing signal VI, and the time Ta is variable appropriately. The method of validating parameters set in the timing generator 30 in synchronism with the timing of ON-turning of the release switch S2 is usable for reducing the release time lag, independently of other configurations.

The still image signal from the CCD image sensor 10 is sent to an analog signal processor 31. As shown in FIG. 3, the analog signal processor 31 consists of a CDS circuit 31a, an AMP circuit 31b, and an A/D converter 31c, and operates synchronously with the charge reading from the CCD image sensor 10 in response to synchronizing pulses from the timing generator 30. The CDS circuit 31a reduces noises from the still image signals by correlated double-sampling. The AMP circuit 31b amplifies the still image signal at a gain corresponding to a photosensitivity that is set by the CPU 15. The A/D converter 31c converts the still image signal, as being received from the AMP circuit 31b, to digital image data, and outputs it to an image input controller 32. The image input controller 32 controls input of the image data into a data bus 33. The data bus 33 connects the CPU 15, an image processor 34, a data compressor 35, an AF detector 36, an AE/AWB detector 37, a media controller 38, an internal memory 39, an LCD driver 40 and a timer 41 to each other, so that these components are controlled by the CPU 15, and may exchange data from each other.

The image processor 34 processes the image data for gamma-correction, white-balance correction and the like. The data compressor 35 compresses the image data before recording it on the memory card 11. The data compressor 35 also expands the compressed image data as it is read out from the memory card 11 in the player mode. The AF detector 36 detects contrast of images as being picked up through the CCD image sensor 10 by inspecting the image data output from the image input controller 32, and sends data of the detected contrast to the CPU 15, for the sake of focusing the photographic lens 3. With reference to the contrast data, the CPU 15 drives the focusing mechanism 22 to make the images of the present subject have a maximum contrast.

The AE/AWB detector 37 detects a subject brightness of the present subject and a light source type on the basis of the image data from the image input controller 32, and output data of the subject brightness and the light source to the CPU 15. Based on the light source data, the CPU 15 sets up parameters for the white-balance correction in the image processor 34. Based on the subject brightness data, the CPU 15 decides a combination of an aperture value, a shutter speed and a photosensitivity, for a proper exposure value. To decide an aperture value, a shutter speed and a photosensitivity, the CPU 15 uses one of a first video program for the first video exposure mode, a second video program for the second video exposure mode and a still image program for the still image exposure mode, wherein these programs virtually consist of diagrams or characteristic curves.

To drive the CCD image sensor 10 in the first video exposure mode, the CPU 15 decides an electronic shutter speed, an aperture value and a photosensitivity based on the subject brightness data according to the first video program, and sets the decided values in the appropriate sections. In this case, the CPU 15 decides and revises the electronic shutter speed, the aperture value and the photosensitivity each time the subject brightness changes.

In the AE process in the first preparation process, which is executed upon the release button 4 being pressed halfway, an electronic shutter speed, an aperture value, and a photosensitivity are decided based on the subject brightness data according to the still image program. Among these values, the aperture value is set in the stop diaphragm 23 in the first preparation process, as described above. The electronic shutter speed and the photosensitivity are held in the CPU 15 so long as the release button 4 is pressed halfway, and are set up in the second preparation process that is executed upon the release button 4 being pressed to the full.

On the still image exposure, the mechanical shutter 24 is additionally used so as to close the mechanical shutter 24 in a given time from the start of the frame period. Therefore, the electronic shutter speed is decided taking account of shutter efficiency of the mechanical shutter 24.

To drive the CCD image sensor 10 in the second video exposure mode, the aperture value decided for the still image photography in the AE process, in the way as described above, is applied to the second video program that is a diagram for aperture-priority program. So the electronic shutter speed and the photosensitivity are determined under the aperture value, to set a proper exposure value for the subject brightness.

The media controller 38 controls writing and reading of data on the memory card 11. The image data to be written in the memory card 11 is sent to the media controller 38, after being processed in the image processor 34 and the data compressor 35. In the player mode, the media controller 38 reads out the image data from the memory card 11, and sends it to the data compressor 35, where the image data is expanded and then sent to the internal memory 39.

The internal memory 39 is, for example, an SDRAM that allows high-speed writing and reading, and written with image data of those images to be displayed on the LCD 9, still images to be recorded in the still image recording, and those obtained and recorded in the video shooting mode. In the first and second video exposure modes, the image data is input in the internal memory 39 frame after frame at the respective frame rates.

The LCD driver 40 drives the LCD 9 based on the image data read out from the internal memory 39. So the LCD 9 displays images being photographed through the CCD image sensor 10, or ones read out from the memory card 11. The LDC driver 40 drives the LCD 9 at the reproductive frame rate of 60 Hz.

Figure 4:
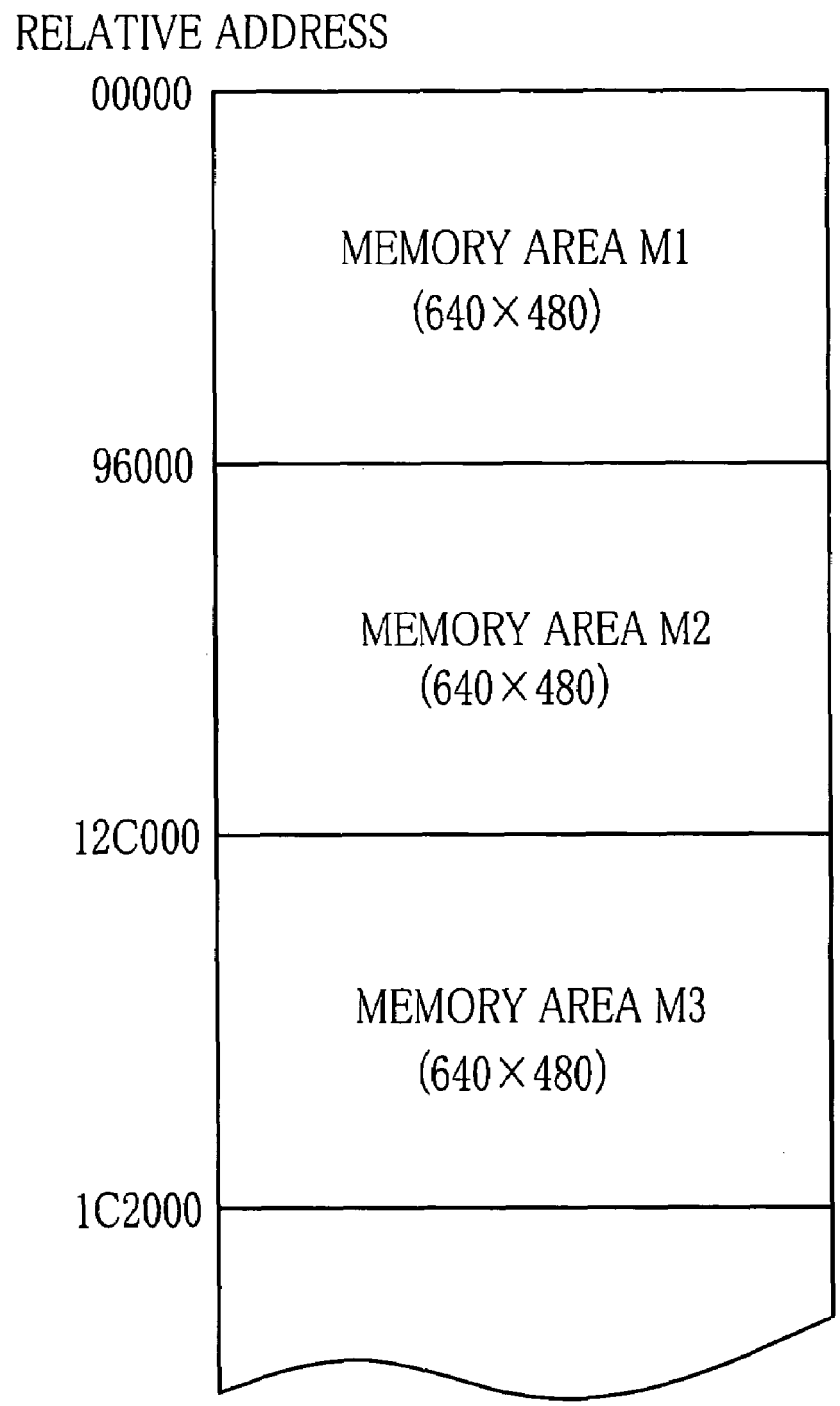
FIG. 4 is an explanatory diagram illustrating an internal memory that is virtually divided into a number of memory areas in first and second video exposure modes.

As described above, in the first and second video exposure modes, the reproductive frame rate of the LCD driver 40 is different from the frame rate used for writing the image data in the internal memory 39. To absorb the difference between these frame rates in the first and second video exposure modes, the internal memory 39 is virtually provided with memory areas M1, M2 and M3, as shown for example in FIG. 4, each of which can store image data of one frame, i.e. 640×480 pixels, so that the image data is written frame by frame in one of the memory areas M1 to M3.

On the other hand, the LCD driver 40 reads the image data in a continuous succession from one of the memory areas which complete writing the image data, and then switches to another memory area for reading the image data. In the first video exposure mode, the LCD driver 40 reads the image data twice from the same memory area at each access to the individual memory area. In the second video exposure mode, the LCD driver 40 reads the image data three times from the same memory area at each access to the individual memory area.

In this way, writing image data in the internal memory 39 is carried out asynchronously with reading image data from it, so it is possible to display a slew of images on the LCD 9 in the first and second video exposure modes, although the frame rates used in these video exposure modes are different from the reproductive frame rate.

The timer 41 measures the elapse of time from each trailing edge of the vertical synchronizing signal VI. Based on the elapse of time counted by the timer 41, the CPU 15 decides the timing of setting up the timing generator 30 with the respective parameters for the still image photography.

Figure 5A:
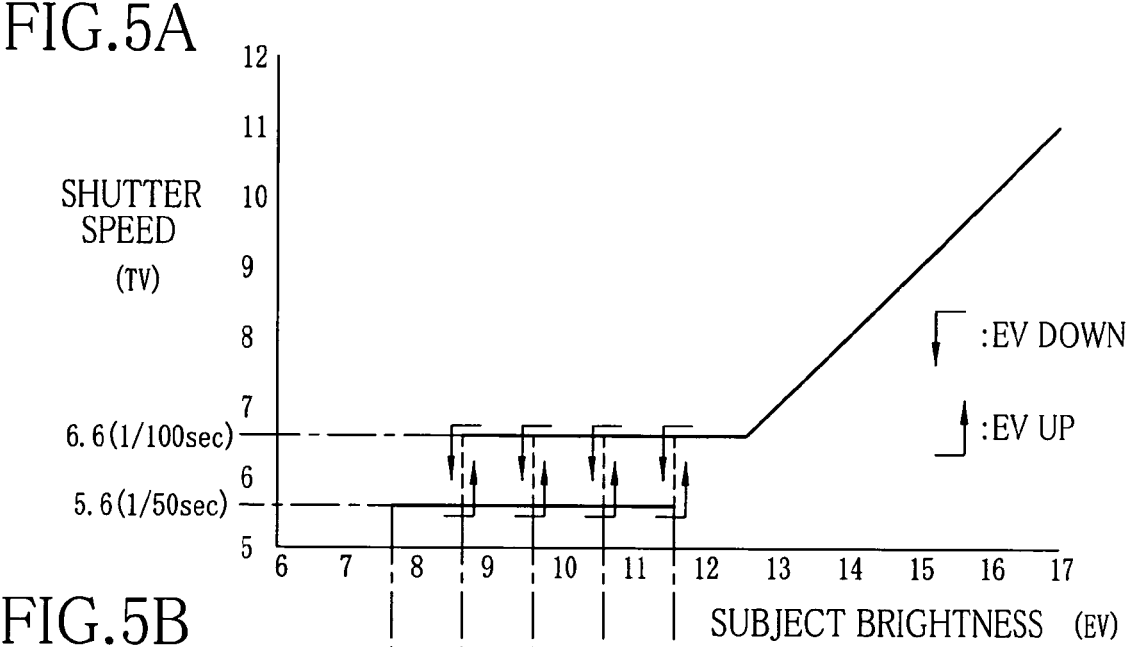
FIGS. 5A, 5B and 5C show program diagrams constituting a first video program used in the first video exposure mode.
Figure 5B:
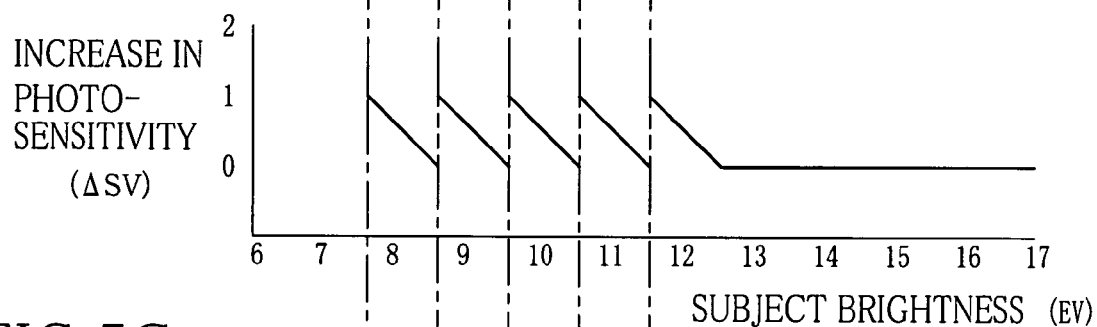
Figure 5C:
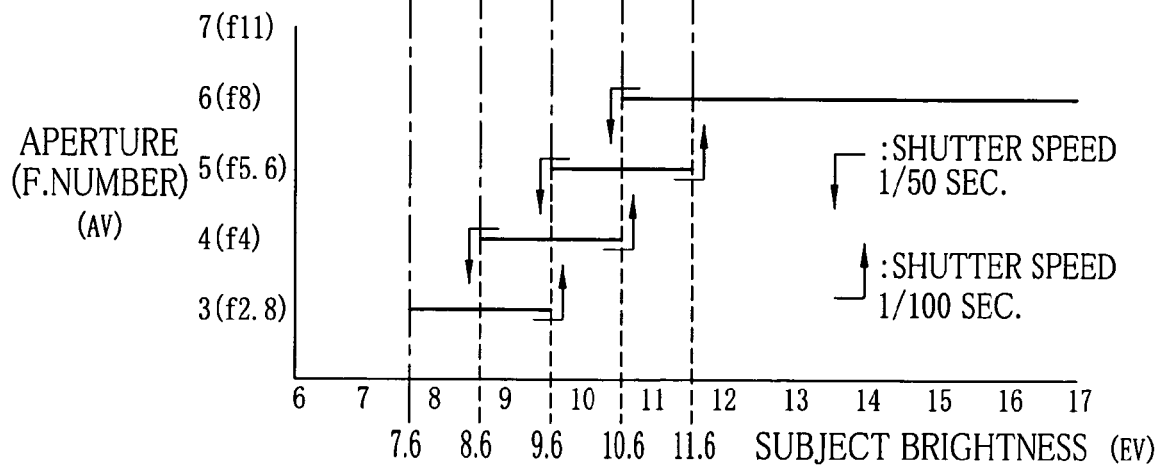

FIGS. 5A, 5B and 5C show diagrams constituting the first video program. FIG. 5A shows a relationship between the subject brightness EV and the electronic shutter speed TV. FIG. 5B show a relationship between the subject brightness EV and increase in photosensitivity ΔSV from a predetermined reference photosensitivity. FIG. 5C shows a relationship between the subject brightness EV and the aperture value AV.

According to the first video program, the increase in photosensitivity ΔSV is zero while the subject brightness is in a high brightness range. In other words, where the subject brightness is not less than EV12.6, the referential photosensitivity is used. And the aperture is maintained at a minimum value AV6(F8), whereas the electronic shutter speed is varied according to the subject brightness. Where the subject brightness is less than EV12.6, the electronic shutter speed is set either at TV6.6 (1/100 sec.) or at TV5.6 (1/50 sec.) thereby to prevent the flickers at the frame rate of 30 Hz, while the aperture and the photosensitivity are varied according to the subject brightness, to control the exposure properly to the subject brightness of EV7.6, a lower limit of a subject brightness range available for photography. The photosensitivity is adjusted linearly in a range from the referential value to a value that is one grade higher than the referential value, i.e. ΔSV, whereas the aperture value is adjusted gradually in four levels from AV6(F8) to AV3(F2.8). In a subject brightness range lower than EV12.6, the electronic shutter speed is adjusted according to the subject brightness prior to the aperture value, but prior to the electronic shutter speed, the photosensitivity is adjusted according to the subject brightness. This configuration prevents the aperture value from switching frequently according to the subject brightness, that is, an undesirable operation called hunting.

Concretely, if the subject brightness is so low that a proper exposure value cannot be obtained at the electronic shutter speed of TV6.6 (1/100 sec.), the photosensitivity is increased so far as the increase in photosensitivity ΔSV reaches "1", while the aperture value and the electronic shutter speed are maintained unchanged. After the increase in photosensitivity ΔSV reaches "1", the electronic shutter speed is switched to TV5.6 (1/50 sec.) and the increase in photosensitivity ΔSV is adjusted again to obtain a proper exposure value, while the aperture value is maintained unchanged. If the increase in photosensitivity ΔSV would be more than "1" even at the electronic shutter speed of TV5.6 (1/50 sec.) in order to obtain a proper exposure value without changing the aperture value, the aperture value is lowered by one grade so that a proper exposure value may be obtained by adjusting the increase in photosensitivity ΔSV from 0 to 1. If the increase in photosensitivity ΔSV would still be more than "1" for obtaining a proper exposure value even after the aperture value is lowered one grade, the aperture value may further be stopped down to a value with which the increase in photosensitivity ΔSV is from 0 to 1 to obtain a proper exposure value.

On the contrary, if the subject brightness is so high that a proper exposure value cannot be obtained at the electronic shutter speed of TV5.6 (1/50), the photosensitivity is lowered unless the increase in photosensitivity ΔSV reaches zero, while the aperture value and the electronic shutter speed are maintained unchanged. After the increase in photosensitivity ΔSV reaches "0", i.e. after the photosensitivity reaches the referential value, the electronic shutter speed is switched to TV6.6 (1/100 sec.) and the increase in photosensitivity ΔSV is adjusted again to obtain a proper exposure value, while the aperture value is maintained unchanged. If the increase in photosensitivity ΔSV would be less than "0" even at the electronic shutter speed of TV6.6 (1/100 sec.) in order to obtain a proper exposure value without changing the aperture value, the aperture value is raised by one grade so that a proper exposure value may be obtained by adjusting the increase in photosensitivity ΔSV from 0 to 1. If the increase in photosensitivity ΔSV would still be less than "0" for obtaining a proper exposure value even after the aperture value is raised one grade, the aperture value may further be raised to a value with which the increase in photosensitivity ΔSV is from 0 to 1 to obtain a proper exposure value.

Figure 6:
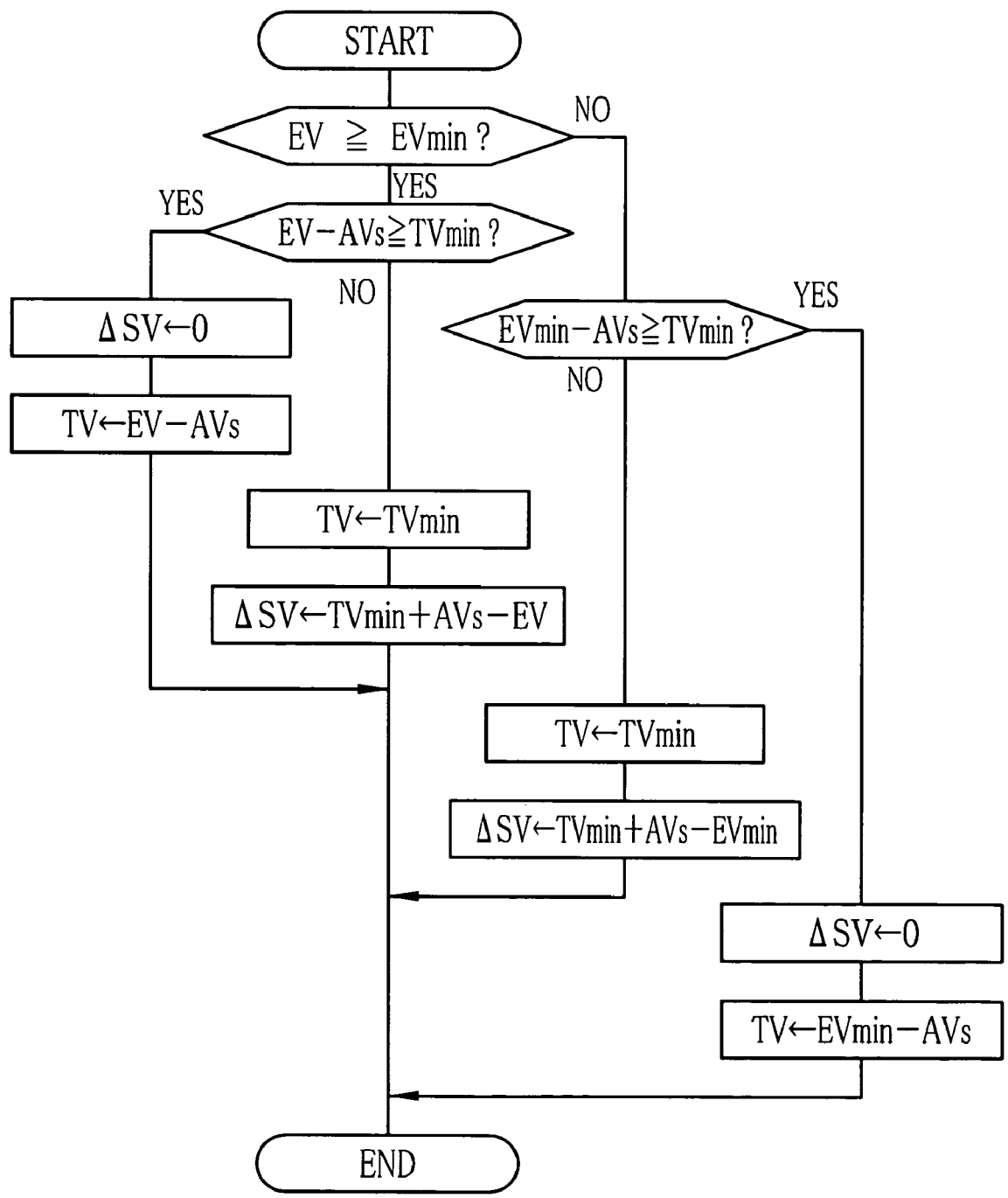
FIG. 6 is a flowchart illustrating a sequence of deciding electronic shutter speed and photosensitivity in the second video exposure mode.

FIG. 6 shows a sequence of deciding the electronic shutter speed and the photosensitivity with respect to the subject brightness according to the second video program. In FIG. 6, EVmin represents the above-mentioned lower limit of the subject brightness range, EV a subject brightness of the present subject, AVs an aperture value, TV an electronic shutter speed, TVmin the minimum electronic shutter speed available in the second video exposure mode, which is TV4.4 (1/20 sec.) because the frame rate is 20 Hz.

As described above, the aperture value AVs used in the second video exposure mode is an aperture value used for still image photography, which is decided according to the still image program, responding to the half-pressing of the release button 4. Though it is not shown in the drawings, the still image program adjusts the aperture value for example in 10 grades, by ⅓ at one step.

Where the subject brightness is above the lower limit, and the electronic shutter speed can be equal to or more than the minimum electronic shutter speed TVmin in order to obtain a proper exposure value for the subject brightness in combination with the referential photosensitivity ($\Delta SV=0$) and the given aperture value AVs ($EV \geq EVmin$, $EV-AVs \geq TVmin$), the electronic shutter speed is determined according to the subject brightness under the referential photosensitivity and the given aperture value ($\Delta SV=0$, $TV=EV-AVs$). If, however, the electronic shutter speed would be lower than the minimum electronic shutter speed TVmin for obtaining a proper exposure value under the referential photosensitivity ($\Delta SV=0$) and the given aperture value ($EV \geq EVmin$, $EV-AVs<TVmin$), the electronic shutter speed is set to be the minimum electronic shutter speed TVmin, and the increase in photosensitivity $\Delta SV$ is adjusted to obtain a proper exposure value in combination with the minimum electronic shutter speed and the given aperture value ($TV=TVmin$, $\Delta SV=TVmin+AVs-EV$).

On the other hand, where the subject brightness is below the lower limit, and the electronic shutter speed can be equal to or more than the minimum electronic shutter speed TVmin in order to obtain a proper exposure value for the lowest subject brightness under the referential photosensitivity ($\Delta SV=0$) and the given aperture value AVs ($EV<EVmin$, $EVmin-AVs \geq TVmin$), the electronic shutter speed is determined according to the lowest subject brightness in combination with the referential photosensitivity and the given aperture value ($\Delta SV=0$, $TV=EVmin-AVs$). If, however, the electronic shutter speed would be lower than the minimum electronic shutter speed TVmin for obtaining a proper exposure under the referential photosensitivity ($\Delta SV=0$) and the given aperture value ($EV<EVmin$, $EVmin-AVs<TVmin$), the electronic shutter speed is set to be the minimum electronic shutter speed TVmin, and the increase in photosensitivity $\Delta SV$ is adjusted to obtain a proper exposure value in combination with the minimum electronic shutter speed and the given aperture value ($TV=TVmin$, $\Delta SV=TVmin+AVs-EVmin$).

Figure 7A:
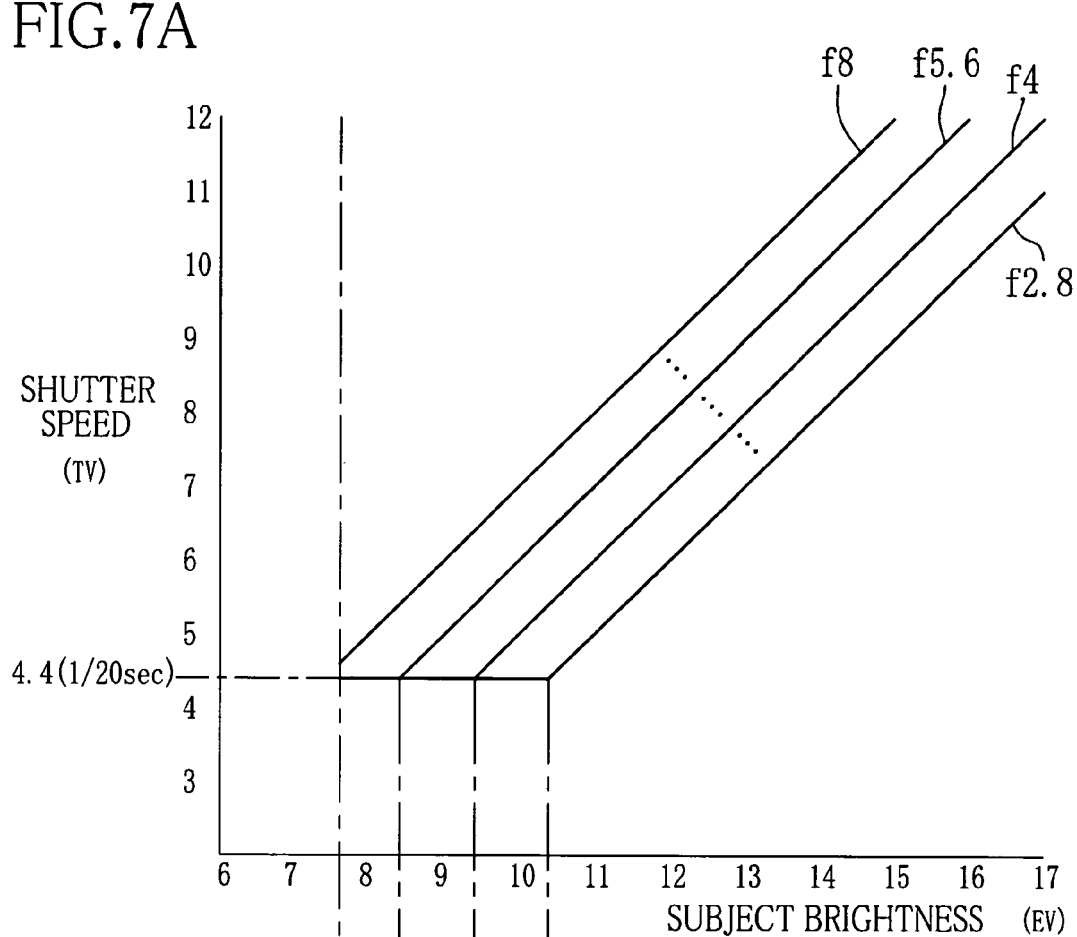
FIGS. 7A and 7B show program diagrams constituting a second video program used in the second video exposure mode.
Figure 7B:
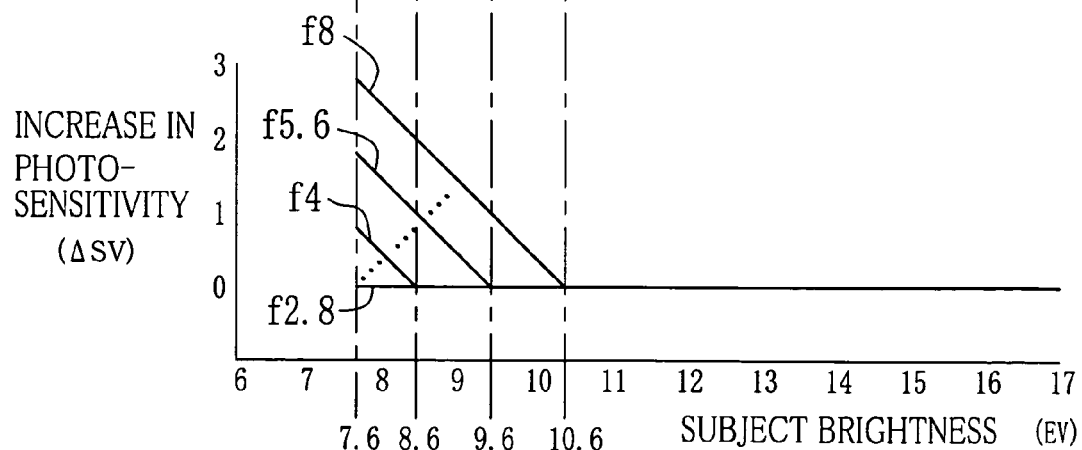

The electronic shutter speed and the photosensitivity are determined for the second video exposure mode in the above-described sequence. So the video shooting is done in the second video exposure mode using the aperture value, the electronic shutter speed, and the photosensitivity, which are determined according to the second video program as shown in FIGS. 7A and 7B, wherein FIG. 7A shows the electronic shutter speed TV in relation to the subject brightness EV, and FIG. 7B shows a relationship between the subject brightness EV and the increase in photosensitivity $\Delta SV$ from the referential photosensitivity.

Since the electronic shutter speed and the photosensitivity for the second video exposure mode are determined in the above-described way, it becomes possible to make the lower limit of the subject brightness range covered in the second video exposure mode equal to that in the first video exposure mode. Therefore it becomes possible to display or warn "under-exposure" to the photographer under the same subject brightness in these modes. So the photographer would not feel strange about this warning.

FIG. 8A shows timing charts in the first video exposure mode. Because the frame rate is 30 Hz in the first video exposure mode, one frame period T1, i.e. the time duration from one trailing edge to the next trailing edge of the vertical synchronizing signal VI, is ⅓₀ seconds. The electronic shutter pulses are generated from the beginning of each frame period, and a time from the stop of generating the electronic shutter pulses to the next trailing edge of the vertical synchronizing signal VI is an effective charging time of the CCD image sensor 10, that is, the electronic shutter speed.

Image data of one frame obtained during a frame period is written in one of the memory areas M1 to M3 during the next frame period. For example, image data obtained during a frame period FR1 is written in the first memory area M1 during a frame period FR2 next to the frame period FR1, and image data obtained during the frame period FR2 is written in the second memory area M2 during a frame period FR3 next to the frame period FR2. Image data obtained during the frame period FR3 is written in the third memory area M3 during a frame period FR4 next to the frame period FR3, and image data obtained during the frame period FR4 is written in the first memory area M1 during a frame period FR5 next to the frame period FR4. This way, the memory areas used for writing image data are switched sequentially.

On the other hand, as described above, the LCD driver 40 reads the image data at the reproductive frame rate of 60 Hz in synchronism with a reproductive vertical synchronizing signal VD. For example, the LCD driver 40 reads the image data twice from the third memory area M3 during the frame period FR2 in synchronism with the reproductive vertical synchronizing signal VD. During the frame period FR3, the LCD driver 40 reads the image data twice from the first memory area M1. During the frame period FR4, the LCD driver 40 reads the image data twice from the second memory area M2. During the frame period FR5, the LCD driver 40 reads the image data twice from the third memory area M3. This way, the image data is read out twice from the same memory area each time the memory area to read is switched one after another.

In the second video exposure mode, as shown in FIG. 8B, because the frame rate is 20 Hz, one frame period T2, i.e. the time duration from one trailing edge to the next trailing edge of the vertical synchronizing signal VI, is ½₀ seconds. Also in the second video exposure mode, the electronic shutter pulses are generated from the beginning of each frame period, and the electronic shutter speed is defined by a time from the stop of generation of the electronic shutter pulses to the next vertical synchronizing signal VI. Therefore, the minimum electronic shutter speed available in the second video exposure mode is ½₀ seconds that is equal to one frame period. Unlike the first video exposure mode, the image data is read out three successive times from the same memory area in the second video exposure mode, but otherwise the image data is written in and read out from one of the memory areas to another in the same way as in the first video exposure mode.

Figure 9A:
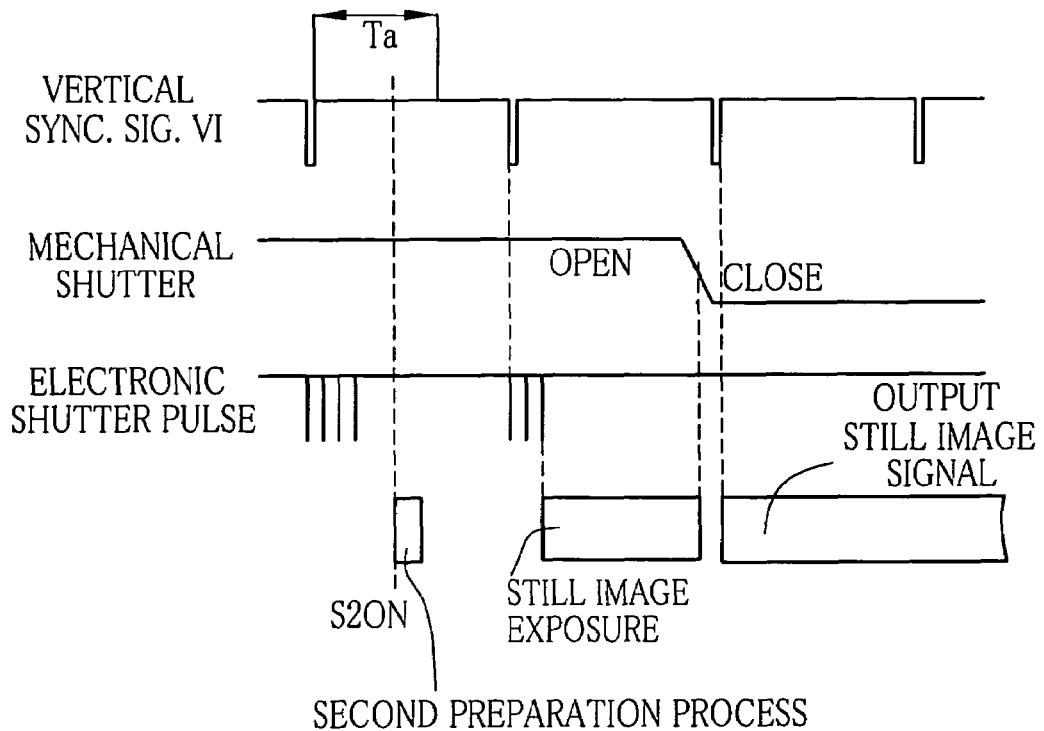
FIGS. 9A and 9B show timing charts illustrating two kinds of operations done when a release button is pressed to the full.
Figure 9B:
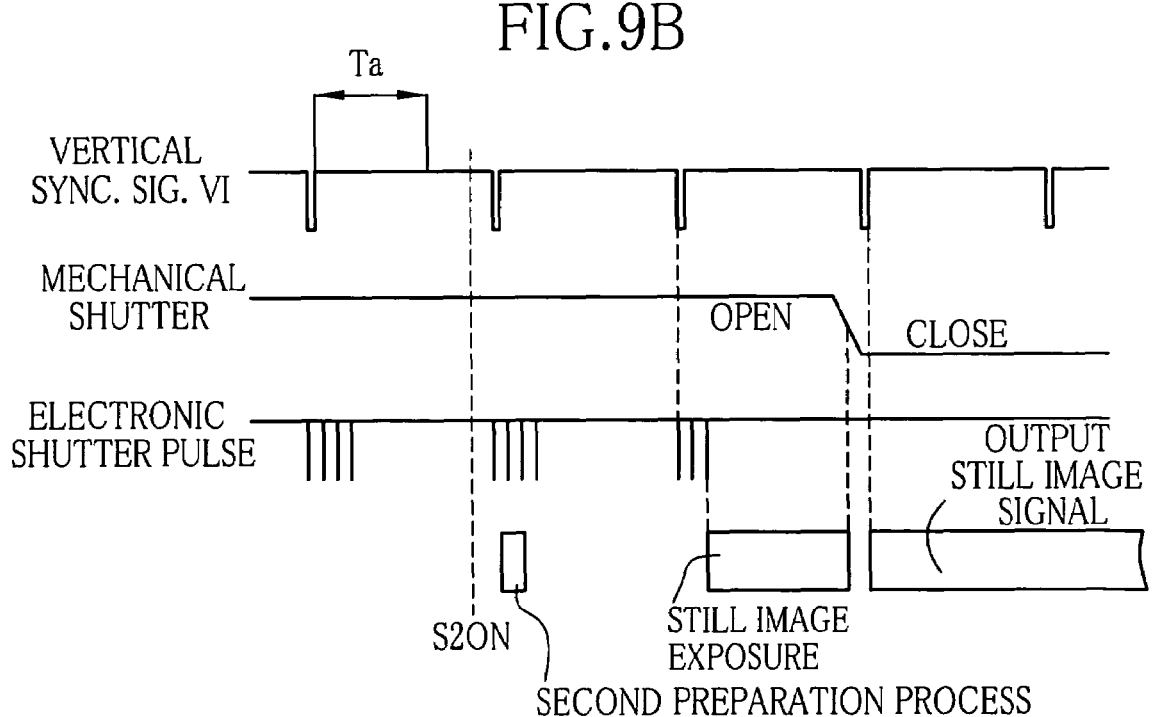

FIGS. 9A and 9B show timing charts illustrating the operation when the second release switch S2 is turned ON by pressing down the release button 4 to the full. As FIG. 9A shows, when the second release switch S2 is turned ON within the time Ta from a leading edge of the vertical synchronizing signal VI, the second preparation process is executed immediately after the ON-turning of the switch S2, so the timing generator 30 is set up with the parameters for the still image exposure mode, the electronic shutter speed., the driving timing of the mechanical shutter 24 and other parameters necessary for the still image photography. In the next frame period to the frame period in which these parameters are set up, the parameters for the still image photography are validated, to make an exposure for photographing a still image through the CCD image sensor 10. At the conclusion of the still image exposure, the mechanical shutter 24 is closed and, during the next frame period to this exposure, the charges are transferred from the CCD image sensor 10 to output the still image signal.

As FIG. 9B shows, when the second release switch S2 is turned ON after the time Ta has elapsed since a leading edge of the vertical synchronizing signal VI, the second preparation process is executed synchronously with a leading edge of the vertical synchronizing signal VI in the next frame period to the frame period in which the switch S2 is turned ON. The still image exposure is done in the frame period after the next.

Figure 10:
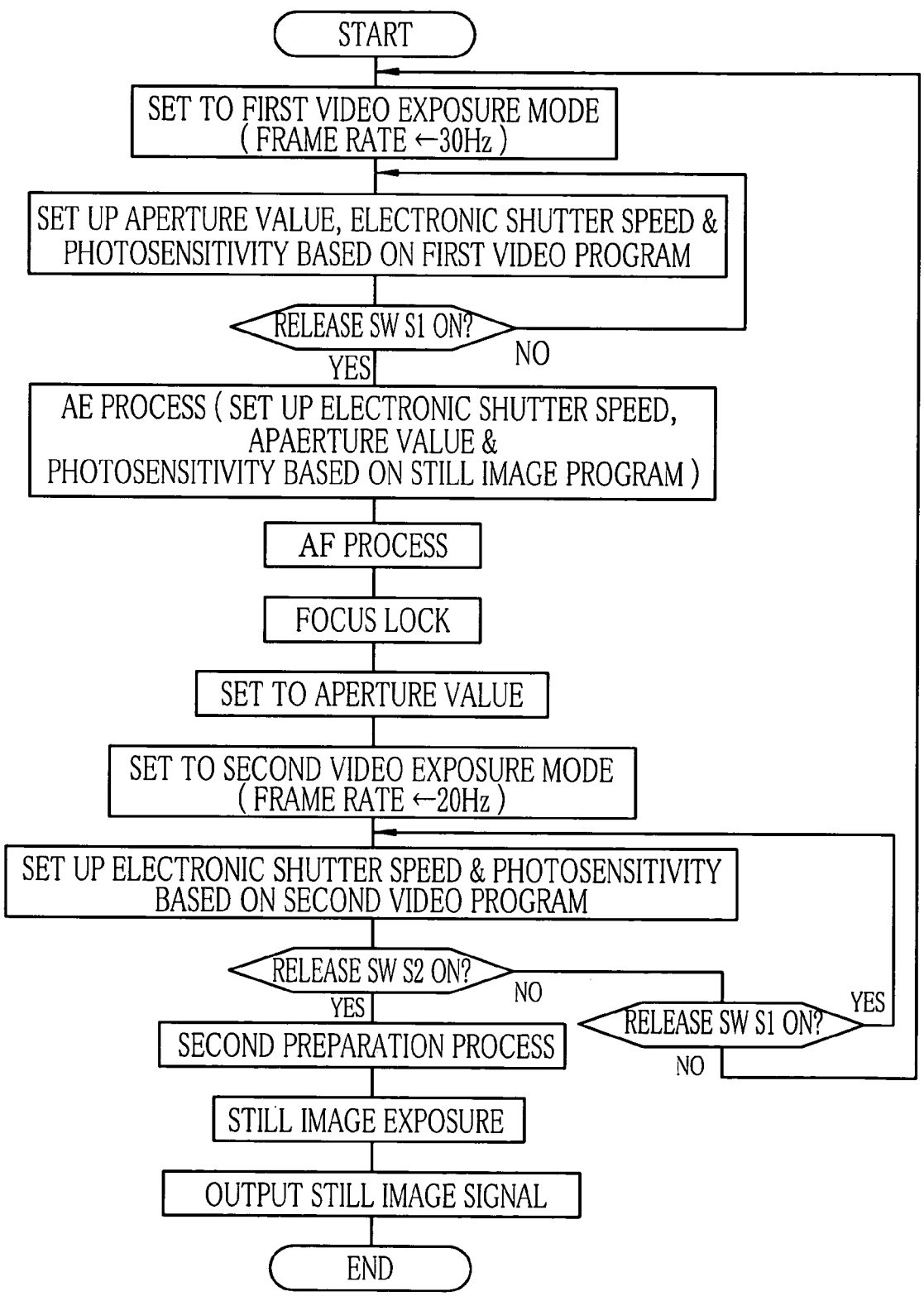
FIG. 10 is a flowchart illustrating a sequence of still image photography.
Figure 11:
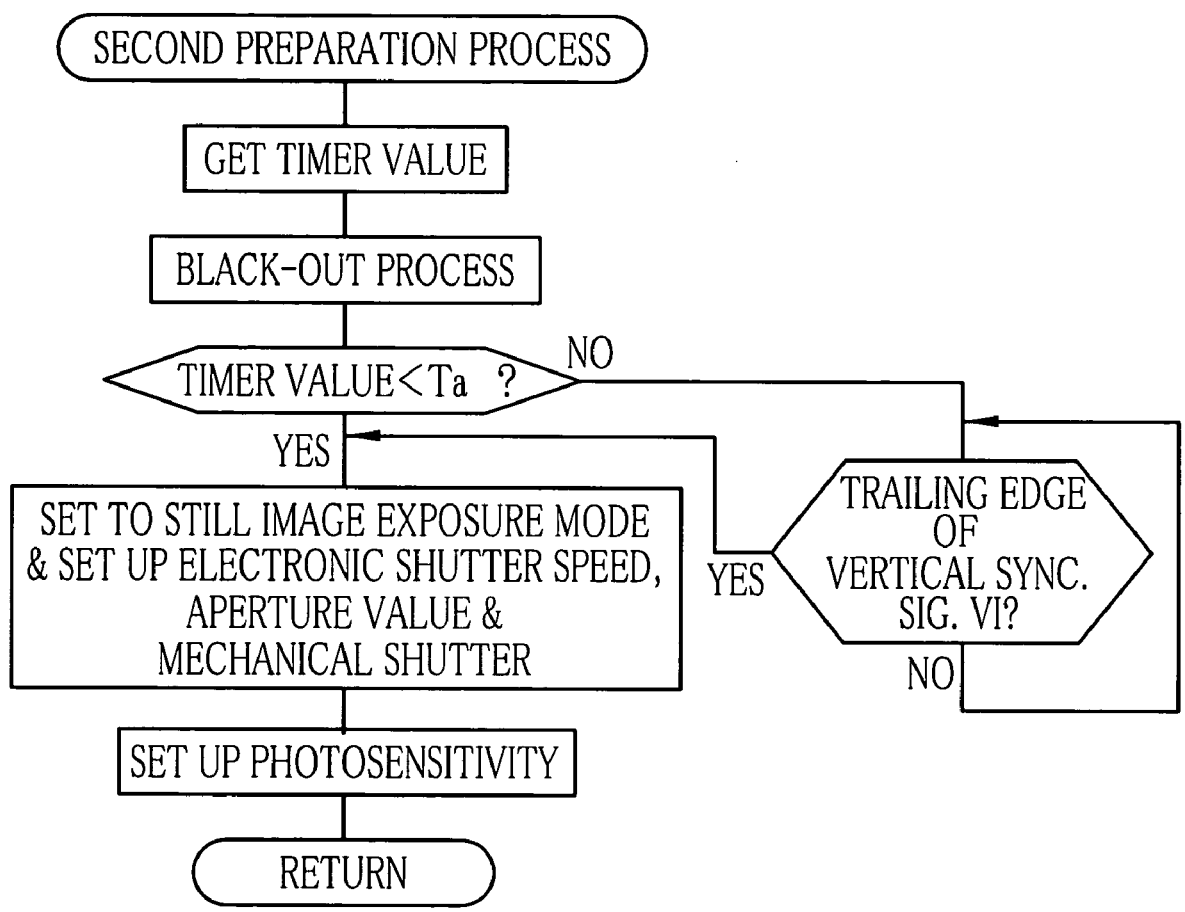
FIG. 11 is a flowchart illustrating a sequence of a second preparation process executed in response to the full-pressing of the release button.

Now the operation of the present embodiment configured as above will be described with reference to FIGS. 10 and 11.

To photograph a still image, the digital camera is powered on, and is set to the camera mode, before selecting the still image photography mode. When the still image photography mode is selected, the CPU 15 sets up the timing generator 30 with the parameters for driving the CCD image sensor 10 in the first video exposure mode, wherein the CCD image sensor 10 is driven at the frame rate of 30 Hz, to start shooting video images at 30 frames per second.

Since the CCD image sensor 10 starts shooting video images, the CCD image sensor 10 outputs still image signals of the video images, and the still image signals are converted into digital image data through the CDS circuit 31a, the AMP circuit 31b and the A/D converter 31c. The image data is sent to the image input controller 32, and via the data buss 33 to the image processor 34, the AF detector 36, the AE/AWB detector 37 and the internal memory 39.

The AF detector 36 sends the contrast data, which is based on the image data, to the CPU 15, so the CPU 15 drives the focusing mechanism to focus the photographic lens 3 on the present subject. The focusing is done anytime to follow up with the change in photographic range or subject distance.

The AE/AWB detector 37 sends the subject brightness data and the light source data to the CPU 15. A subject brightness represented by the subject brightness data is applied to the first video program shown in FIGS. 5A to 5C, to decide the electronic shutter speed, the photosensitivity and the aperture value for providing a proper exposure value to the present subject. The decided electronic shutter speed is set in the timing generator 30, and the decided photosensitivity is set in the AMP circuit 31b. The CPU 15 also controls the stop diaphragm 23 through the driver 27, to provide the decided aperture value. This way, the electronic shutter speed, the aperture value and the photosensitivity are adjusted to the subject brightness. With a change in subject brightness, the electronic shutter speed, the aperture value and the photosensitivity are decided again by use of the first video program, and set in the respective parts. Thus, the exposure value is always adjusted to be proper to the present subject.

On the other hand, based on the light source data, the CPU 15 determines the kind of the light source illuminating the subject, and sets up the image processor 34 with parameters for white-balance in accordance with the kind of the light source. Then the image processor 34 processes the image data for white-balance correction and gamma correction and for other image processing.

When the electronic shutter speed, the aperture value and the photosensitivity are adjusted to the subject brightness in the above-described manner, the CCD image sensor 10 is exposed under the electronic shutter speed and the aperture value, and the still image signal is amplified at a gain corresponding to the photosensitivity. Subsequent image data is processed in the image processor 34, and then sent to the internal memory 39.

In the first video exposure mode, as shown in FIG. 8A, the image data is written frame by frame in one of the memory areas M1 to M3 of the internal memory 39, while switching the memory areas one after another at the frame rate of 30 Hz. Simultaneously, the LCD driver 40 reads the image data twice from the same memory area at the reproductive frame rate of 60 Hz, while switching the memory areas one after another at the frame rate of 30 Hz. Based on the image data, the LCD driver 40 drives the LCD 9 to display a slew of video images of the present subject as being shot through the CCD image sensor 10.

When the subject brightness goes below EV12.6 in the first video exposure mode, the CPU 15 decides the photosensitivity and the aperture value according to the first video program, so as to obtain a proper exposure value under the shutter speed of $1/100$ seconds or $1/50$ seconds. Then the timing generator 30 is set up with the parameter for setting the electronic shutter speed to be $1/100$ seconds or $1/50$ seconds, so the CCD image sensor 10 is driven at the electronic shutter speed to be $1/100$ seconds or $1/50$ seconds. At the same time, the decided photosensitivity is set in the AMP circuit 31b, and the stop diaphragm 23 is controlled to provide the decided aperture value. Accordingly, where the subject brightness is below EV12.6, the electronic shutter speed is set at $1/100$ seconds or $1/50$ seconds, whereas the photosensitivity and the aperture value are adjusted to provide a proper exposure value for the subject brightness unless it goes below EV7.6.

Accordingly, the electronic shutter speed is $1/100$ seconds or $1/50$ seconds, although the CCD image sensor 10 is driven at the frame rate of 30 Hz. Therefore, the digital camera of the present invention would not cause the flicker during the photography under the illumination of fluorescent light driven by the commercial power source, but can display a slew of images adequately.

When the release button 4 is pressed halfway, the first release switch S1 is turned on, upon which the CPU 15 starts the first preparation process, wherein the AE process for still image photography is executed in the first stage, to apply a subject brightness as obtained from the subject brightness data to the still image program and decide the electronic shutter speed, the aperture value and the photosensitivity for the still image photography according to the still image program.

Thereafter the CPU 15 executes the AF process to readjust the focus of the photographic lens 3 by driving a focusing lens 22a on the basis of the contrast data. So long as the release button 4 is kept being pressed, the position of the focusing lens 22a after the readjustment is fixed to lock the focus of the photographic lens 3.

After the AE process and the AF process are accomplished, the CPU 15 sets the stop diaphragm 23 to the aperture value. The stop diaphragm 23 is fixed at this aperture value so long as the release button 4 is kept being pressed. After setting the stop diaphragm 23 to the aperture value, the CPU 15 sets up the timing generator 30 with the parameters for driving the CCD image sensor 10 in the second video exposure mode. As a result, from the next frame period to the frame period when the parameters are set up, the CCD image sensor 10 is driven in the second video exposure mode, starting shooting video images at the frame rate of 20 Hz.

Thereafter, the CPU 15 begins to adjust the electronic shutter speed and the photosensitivity in the sequence as shown in FIG. 6, that is, on the basis of the second video program as shown in FIGS. 7A and 7B. While the release button 4 is being pressed halfway, the CCD image sensor 10 shoots video images under the electronic shutter speed and the photosensitivity, as being adjusted this way, and the fixed aperture value. Subsequent image data are sent to the internal memory 39.

As shown in FIG. 8B, the image data is sent to the internal memory 39 at the rate of 20 frames per second, and is written frame by frame in one of the frame areas of the internal memory 39 while switching the frame areas one another at each frame. On the other hand, the CPU 15 resets the LCD driver 40 to read out the image data three times in succession from the same memory area of the internal memory 39, to drive the LCD 9. Thus, even while the release button 4 is being pressed halfway, a slew of images of the present subject are displayed on the LCD 9.

This way, while the release button 4 is being pressed halfway, it is possible to obtain a proper exposure value under the fixed aperture value, even for a subject whose brightness is in the same lower limit as before the release button 4 being pressed. So the photographer will not feel something strange. Furthermore, since the frame rate of the CCD image sensor 10 is set at 20 Hz even while the electronic shutter speed is being adjusted, a slew of video images displayed on the LCD 9 would not suffer the flicker under the illumination of fluorescent light driven by the commercial power source.

Pressing the release button 4 down to the full is turning the second release switch S2 ON. Upon the switch S2 being turned ON, the CPU 15 carries out the second preparation process as shown in FIG. 11. Specifically, the CPU 15 gets a timer value from the timer 41 at the moment when the second release switch is turned ON, and sends a command for black-out process to the LCD driver 40. The timer value represents an elapse of time from a previous leading edge of the vertical synchronizing signal VI to the time of ON-turning of the switch S2.

Responsive to the command for black-out process, the LCD driver 40 temporarily blacks out the LCD 9, that is, it forces the LCD 9 to display a black image for a moment. The blackout process is for making the photographer feel like taking a photograph by a single-reflex camera whose viewfinder turns black at the moment of exposure because a mirror flaps up to switch over the photographic light path. In addition to that, blacking out the LCD 9 at the moment of exposure prevents the photographer from feeling somewhat awkward when an actually photographed still image, as displayed for a while immediately after the exposure, differs a little from one of the slew of images, which is displayed at the moment when the photographer presses the release button 4 to the full.

The CPU 15 compares the timer value as obtained from the timer 41 with the predetermined time Ta, e.g. 35 msec. If the timer value is less than the time Ta, as shown in FIG. 9A, the second preparation process starts immediately after the second release switch S2 is turned ON, so the timing generator 30 is set up with the parameters for driving in the still image exposure mode, the electronic shutter speed as decided in response to the release button 4 being pressed halfway, and the parameters for the mechanical shutter 24.

If, on the contrary, the timer value is more than the predetermined time Ta, as shown in FIG. 9B, the CPU 15 waits for the next trailing edge of the vertical synchronizing signal VI, that comes first after the ON-turning of the second release switch S2, so as to avoid incomplete setting of the parameters at the beginning of the next frame period. In other words, the CPU 15 begins to set up the timing generator 30 with the parameters for driving the still image exposure mode, the electronic shutter speed and the parameters for the driving timing of the mechanical shutter 24 and the like at the next trailing edge of the vertical synchronizing signal VI.

In either case, the parameters set in the timing generator 30 are validated and an exposure for a still image is done on the CCD image sensor 10 in the next frame period to the frame period when these parameters are set up. During the still image exposure, charges are accumulated in the CCD image sensor 10 at the given electronic shutter speed, ad the mechanical shutter 24 is closed at the conclusion of the exposure.

After the still image exposure, the charges are transferred as still image signal from the CCD image sensor 10. The still image signal is converted into image data through the CDS circuit 31a, the AMP circuit 31b and the A/D converter 31c. When the release button 4 is pressed to the full, the AMP circuit 31b is set up with the photosensitivity for the still image exposure, which is decided in response to the half-pressing of the release button 4. So the AMP circuit 31b amplifies the still image signal at a gain corresponding to the photosensitivity, and the amplified still image signal is converted into the image data.

The image data obtained by the still image photography in the above-described manner is once written in the internal memory 39, and then subjected to the image processing in the image processor 34 for white-balance correction, gamma correction and the like. The processed image data is sent to the data compressor 35, and is compressed therein. The compressed image data is written on the memory card 11 through the media controller 38.

As described so far, the digital camera of the present invention sets the stop diaphragm 23 to the aperture value given for the still image photography prior to the full-pressing of the release button 4, so an exposure for the still image photography can start promptly in response to the full-pressing of the release button 4.

Figure 12:
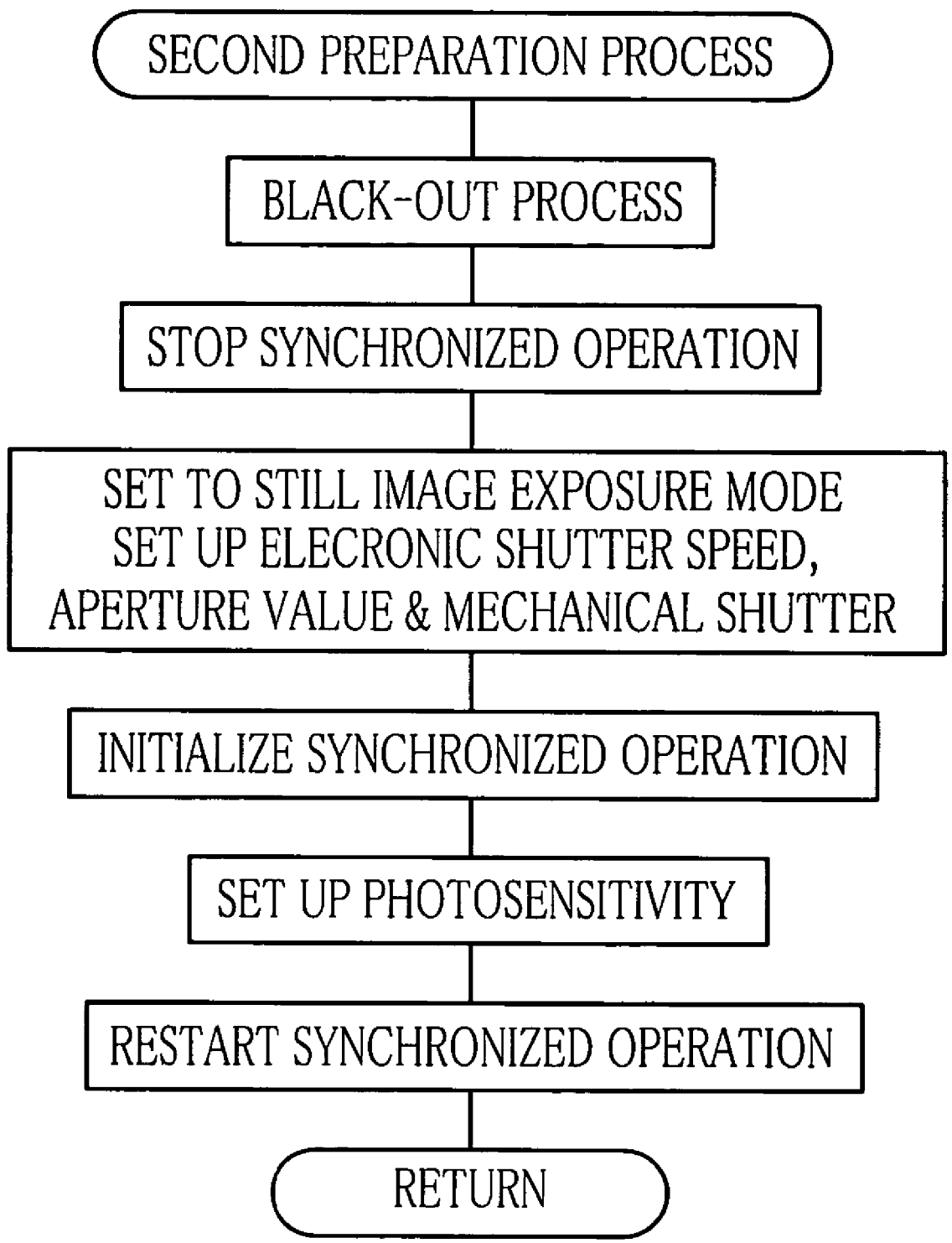
FIG. 12 is a flowchart illustrating a sequence of the second preparation process according to a second embodiment, wherein a still image exposure is done immediately after parameters for still image photography are set up.
Figure 13:
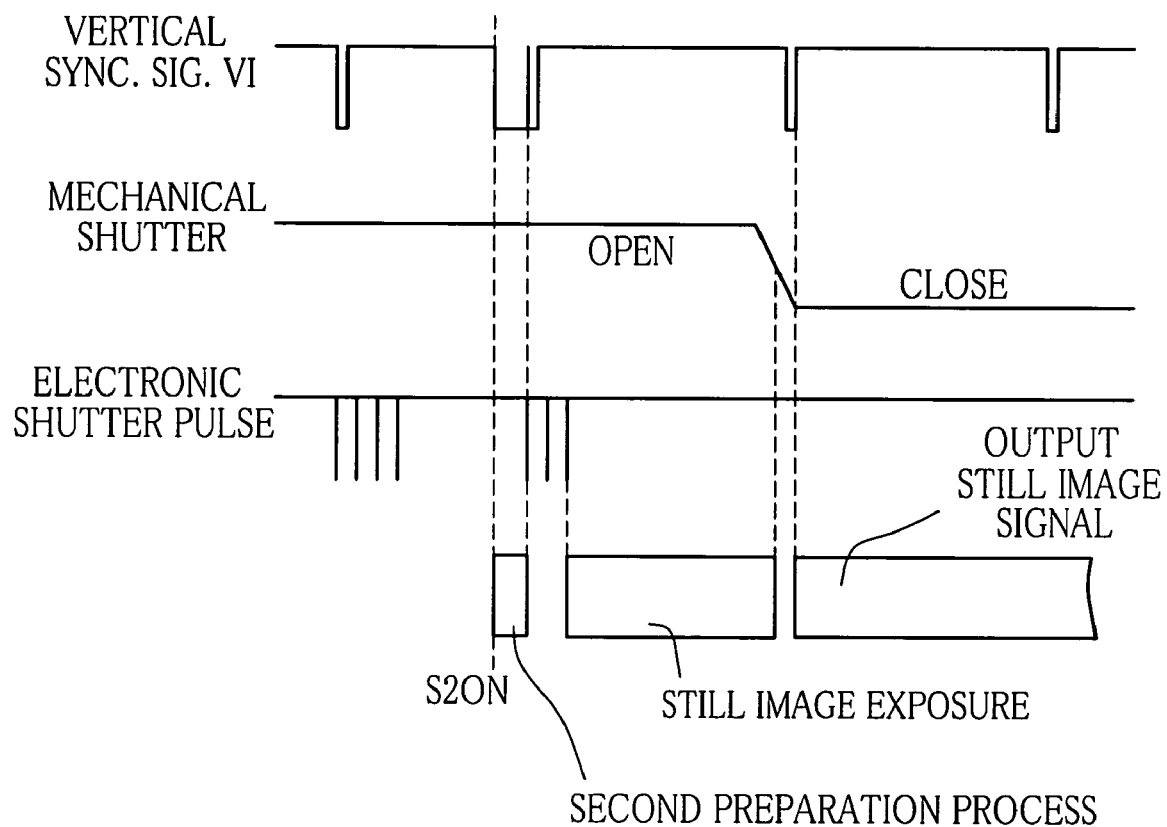
FIG. 13 shows timing charts illustrating an operation done when a release button is pressed to the full in the second embodiment.

FIGS. 12 and 13 show a second embodiment of the present invention, wherein a timing generator restarts its synchronizing operation immediately after the parameter setting for the still image photography, thereby to let a still image exposure go immediately after the parameter setting. The second embodiment is configured the same way as the first embodiment, except some features as set forth below. Therefore, those components which are substantially equivalent to those constituting the first embodiment are designated by the same reference numerals, and description about these components will be omitted for brevity sake.

In the same way as described above, the timing generator 30 validates parameters as set therein from the next frame period, i.e. from a leading edge of a vertical synchronizing signal VI, which comes first after the completion of parameter setting. Thereby, the timing generator 30 starts outputting a drive signal to drive the CCD image sensor 10 in correspondence with the validated parameters.

In a second preparation process, as shown in FIG. 12, a CPU 15 outputs a command for black-out process to an LCD driver 40 and, thereafter, stops the timing generator 30 from its synchronizing operation that is generating the vertical synchronizing signal VI and different kinds of drive signals that are generated based on the vertical synchronizing signal VI, for driving the CCD image sensor 10, a mechanical shutter 24 and other components.

After stopping the synchronizing operation, the CPU 15 sets up the timing generator 30 with parameters for driving the CCD image sensor 10 in the still image exposure mode, an electronic shutter speed for a still image exposure decided upon a release button 4 being pressed halfway, and parameters for driving timing of the mechanical shutter 24. Also a parameter for initializing the synchronizing operation is set in the timing generator 30. At the same time, a photosensitivity for the still image exposure, which is also decided upon the half-pressing of the release button 4, is set in an AMP circuit 31b.

After completing setting these parameters and the photosensitivity, the CPU 15 gives a command for restarting the synchronizing operation to the timing generator 30. The timing generator 30 restarts the synchronizing operation in response to the command for restarting, but at a timing when the timing generator 30 restarts generating the vertical synchronizing signal VI on the basis of the parameter given for initializing the synchronizing operation.

Thereby the vertical synchronizing signal VI rises up immediately after the restart of the synchronizing signal, as shown in FIG. 13, and the parameters for still image photography, as being set in the timing generator 30 during the intermission of the synchronizing operation, are effected to make a still image exposure.

As a result, whichever timing the release button 4 is pressed to the full with respect to the vertical synchronizing signal VI, the parameters for still image photography are set without delay, and an operation for a still image exposure is effected immediately after the parameter setting. Therefore, the release time lag is reduced to the minimum.

Figure 14:
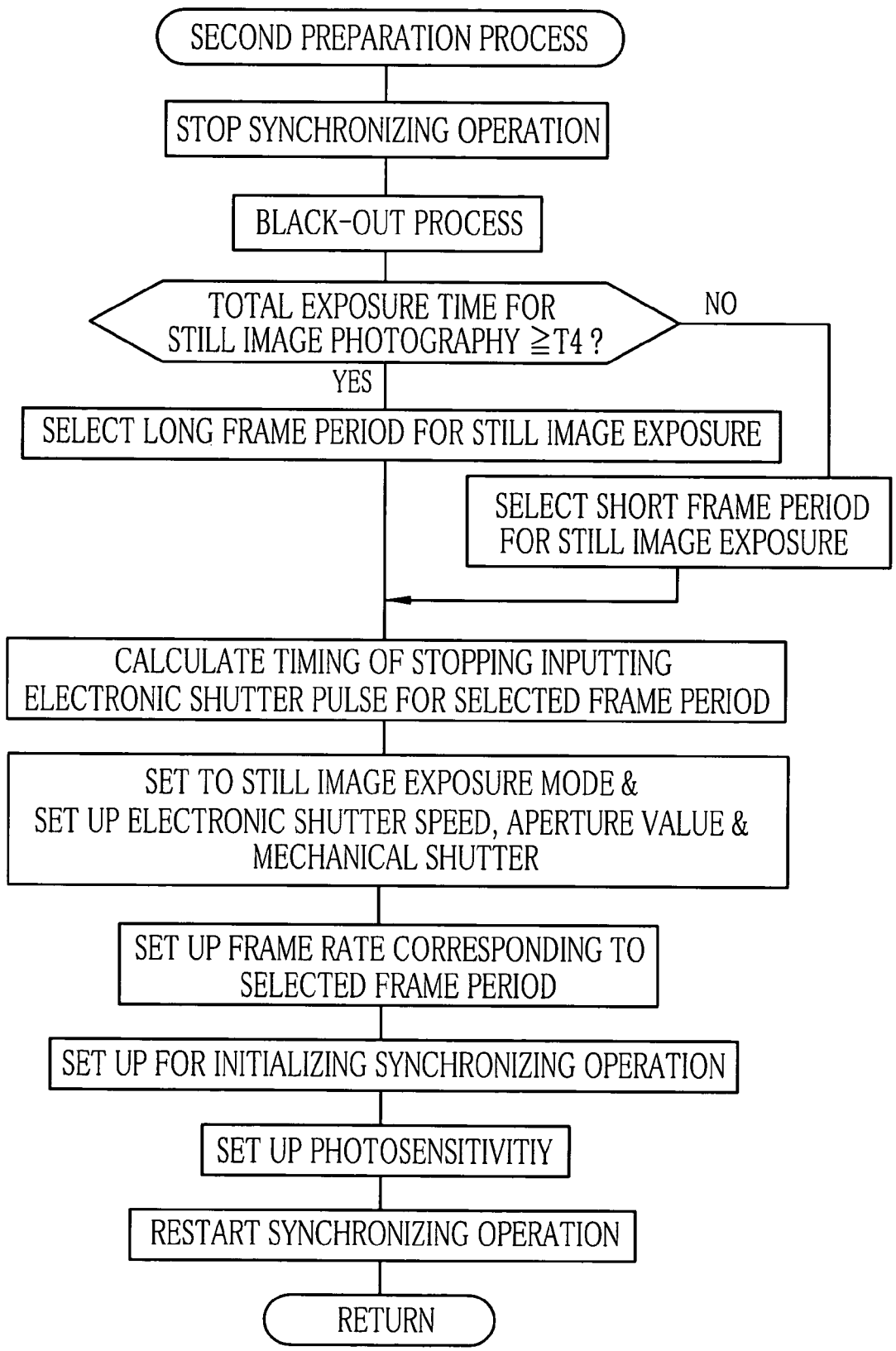
FIG. 14 is a flowchart illustrating a sequence of the second preparation process, according to a third embodiment wherein a short frame period or a long frame period is selected for a still image exposure.

FIGS. 14 and 15 show a third embodiment of the present invention, wherein the timing of starting effective charge accumulation is put forward by selecting the shortest frame period from among those frame periods of different lengths which permit charge accumulation within an exposure time that is decided depending upon the subject brightness, in order to reduce the release time lag.

In the illustrated example, the frame period for a still image exposure is chosen between a long frame period T3 and a shorter frame period T4, and two kinds of frame rates are available for the still image exposure in correspondence with these two kinds of frame periods T3 and T4. For example, the time T3 is 50 msec., whereas the time T4 is 30 msec.

Parameters for driving timing of a mechanical shutter 24 are previously determined such that, whichever frame period is selected, the mechanical shutter 24 moves to its closed position simultaneously with the end of the selected frame period, while taking account of a time ΔTs necessary for the mechanical shutter 24 to move from its open position to the closed position. The time ΔTs is 15 msec. in this example. That is, if the long frame period T3 is selected, a command for closing the mechanical shutter 24 is generated in a time "T3−ΔTs" from the start of the long frame period T3. On the other hand, if the short frame period T4 is selected, a command for closing the mechanical shutter 24 is generated in a time "T4−×Ts" from the start of the long frame period T3.

In the second preparation process, as shown in FIG. 14, the CPU 15 stops the synchronizing operation of a timing generator 30 and sends a command for black-out process to an LCD driver 40 and, thereafter, compares the time T4 with a minimum total exposure time necessary for an exposure to photograph a still image. The total exposure time is a time duration from the stop of inputting electronic shutter pulses to the close of the mechanical shutter 24, which can be calculated in correspondence with an electronic shutter speed that is determined based on a measured subject brightness when a release button 4 is pressed halfway.

If the total exposure time is not less than the time T4, the long frame period is selected. On the contrary, if the total exposure time is less than the time T4, the short frame period is selected. In this way, the shortest frame period is selected from among those frame periods which permit charge accumulation within an exposure time determined depending upon the subject brightness.

Furthermore, the CPU 15 decides the timing of stopping inputting the electronic shutter pulses during the frame period for the still image exposure. Specifically, the CPU 15 detects a difference between the length of the selected frame period T3 or T4 and the exposure time corresponding to the electronic shutter speed decided according to the subject brightness, and decides the parameters for the electronic shutter speed so as to stop the electronic shutter pulses when a time representative of the difference has passed since the start of the frame period for the still image exposure.

The parameters for the frame rate corresponding to the frame period to be selected, those for the driving timing of the mechanical shutter 24 that corresponds to the selected frame period, and those for the electronic shutter speed are set in the timing generator 30. Also a parameter for initializing the synchronizing operation is set in the timing generator 30, and a photosensitivity for the still image exposure is set in an AMP circuit 31b. Thereafter, the CPU 15 gives a command for restarting the synchronizing operation to the timing generator 30.

Figure 15A:
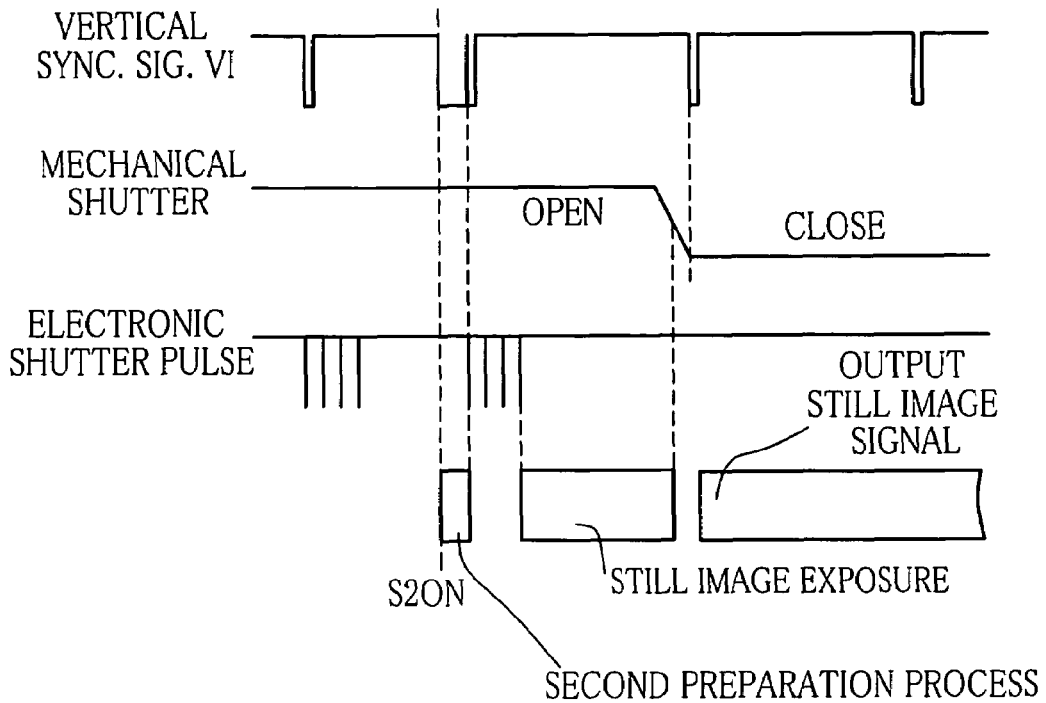
FIGS. 15A and 15B show timing charts illustrating two kinds of operations done when a release button is pressed to the full in the third embodiment.
Figure 15B:
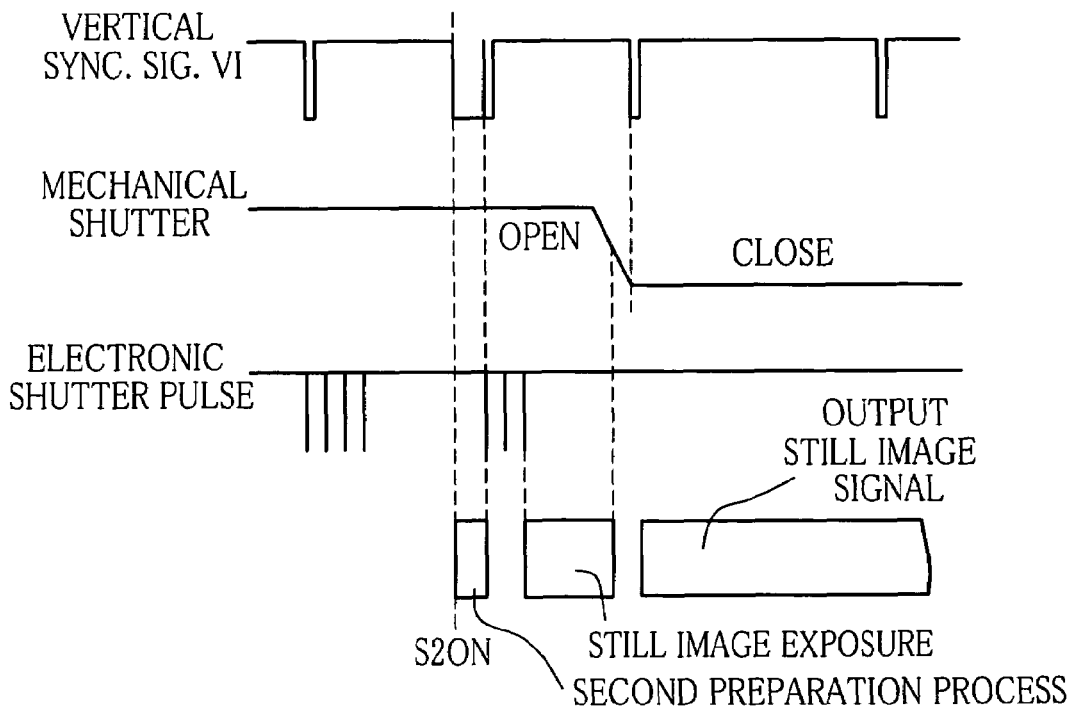

Since the second preparation process is carried out in this way, if the total exposure time corresponding to the shutter speed decided upon the half-pressing of the release button 4 is equal to or more than the time T4, the still image exposure is done in the long frame period whose length is T3, as shown in FIG. 15A. On the contrary, if the total exposure time corresponding to the shutter speed decided upon the half-pressing of the release button 4 is less than the time T4, the still image exposure is done in the short frame period whose length is T4, as shown in FIG. 15B, so the mechanical shutter 24 is closed sooner than the case where the still image exposure is done in the long frame period. Because the timing of stopping inputting the electronic shutter pulses is put forward as the selected frame period is shorter and thus the mechanical shutter 24 is closed sooner, the release time lag is reduced.

Although the frame period is chosen between the long and short ones in the above embodiment, it is possible to prepare more than two kinds of frame periods as options. FIG. 16 shows a variation where the frame period is selected from among four kinds. Specifically, if the total exposure time is less than 17 msec., a frame period of 17 msec. is selected. If the total exposure time is not less than 17 msec. and less than 25 msec., a frame period of 25 msec. is selected. If the total exposure time is not less than 25 msec. and less than 33 msec., a frame period of 33 msec. is selected. If the total exposure time is not less than 33 msec. and less than 50 msec., a frame period of 50 msec. is selected.

FIG. 17 shows an embodiment wherein a single electronic shutter pulse is input at the start of one frame period for a still image exposure, and a mechanical shutter is activated at a timing that varies depending upon an exposure time set for the still image exposure, so as to adjust the exposure time to the subject brightness that is detected when a release button is pressed halfway. Otherwise, the embodiment of FIG. 17 operates in the same way as the embodiment shown in FIG. 14.

According to the embodiment of FIG. 17, a CPU 15 generates the electronic shutter pulse simultaneously with the start of the frame period for the still image exposure and, thereafter, sets up a timing generator 30 with parameters for an electronic shutter speed so as to prohibit generating the electronic shutter pulse. In addition to that, parameters for driving timing of a mechanical shutter 24 are set to cause the mechanical shutter 24 to move to its closed position at a timing from the start of the frame period for the still image exposure, that corresponds to a shutter speed decided according to the subject brightness.

According to this embodiment, regardless of which of the long and short frame periods is selected as the frame period for the still image exposure, as shown in FIGS. 18A and 18B, an effective exposure starts simultaneously with the start of the selected frame period. So the release time lag is reduced. It is to be noted that the method described with reference to FIG. 17 is applicable to a case where the length of the frame period is constant, though the illustrated embodiment selects one of the long and short frame periods depending upon the necessary total exposure time, like in the embodiment shown in FIG. 14.

In the embodiments shown in FIGS. 14 to 18, the synchronizing operation of the timing generator is restarted after the parameters for initializing the synchronizing operation are set in the timing generator, but it is possible to omit this process.

Although the present invention has been described with respect to the embodiments applied to the digital camera, the present invention is applicable to any kinds of photographic devices, such as a camera phone.

Thus, the present invention is not to be limited to the above embodiments but, on the contrary, various modifications will be possible without departing from the scope of claims appended hereto.

What is claimed is:

1. A photographic device comprising:
   an image sensor having a function of an electronic shutter that gives effect to charging from when electronic shutter pulses stop being input in said image sensor;
   a mechanical shutter that is movable between an open position letting photographic light into said image sensor and a closed position blocking photographic light from said image sensor;
   a drive device generating drive signals including said electronic shutter pulses for driving said image sensor; and
   a control device that sets up said drive device with timing of stopping inputting said electronic shutter pulses, so as to cause said drive device to generate only a single electronic shutter pulse at the start of a frame period for still image photography in response to a release signal entered to start photographing a still image, said control device causing said mechanical shutter to move to said closed position when an exposure time determined according to a subject brightness has elapsed since said single electronic shutter pulse,
   wherein said drive device is a timing generator that validates at the start of each frame period contents as set therein by said control device, and said control device sets up said timing generator for the still image photography and initializes synchronizing operation of said timing generator immediately after the entry of said release signal, thereby to restart said synchronizing operation and start the frame period for still image photography immediately after said timing generator is set up for still image photography.

2. A control method for a photographic device using an image sensor and a mechanical shutter, said image sensor having a function of an electronic shutter that gives effect to charging from when electronic shutter pulses generated by a drive device stop being input in said image sensor, said control method comprising steps of:
   stopping inputting of said electronic shutter pulses so as to cause said drive device to generate only a single electronic shutter pulse in said image sensor at the start of a frame period for still image photography in response to a release signal entered to start photographing a still image; and
   activating said mechanical shutter to block photographic light from said image sensor when an exposure time determined according to a subject brightness has elapsed since said single electronic shutter pulse,
   wherein said drive device is a timing generator that validates at the start of each frame period contents as set therein by a control device, and said control device sets up said timing generator for the still image photography and initializes synchronizing operation of said timing generator immediately after the entry of said release signal, thereby to restart said synchronizing operation and start the frame period for still image photography immediately after said timing generator is set up for still image photography.

* * * * *